United States Patent [19]

Hoggatt et al.

[11] Patent Number: 5,502,652
[45] Date of Patent: Mar. 26, 1996

[54] METHOD AND APPARATUS FOR MEASURING HEAT TRANSFER IN SMALL DIAMETER PIPES USING ACOUSTIC SIGNALS

[76] Inventors: Austin C. Hoggatt, 4601 Grass Valley Rd., Oakland, Calif. 94605; Martin Graham, 3060 Buena Vista Way, Berkeley, Calif. 94708; David D. Cudaback, 6639 Longwalk Dr., Oakland, Calif. 94611; Melvin P. Klein, 1140 Keith Ave., Berkeley, Calif. 94708; John W. Otvos, 110 Raven Hill Rd., Orinda, Calif. 94563; Paul L. Richards, 900 Euclid Ave., Berkeley, Calif. 94708

[21] Appl. No.: 296,015

[22] Filed: Aug. 24, 1994

[51] Int. Cl.$^6$ ............................................. G06F 15/20
[52] U.S. Cl. .................... 364/510; 364/464.04; 165/22
[58] Field of Search .................................. 364/510, 505, 364/557, 464.04, 465, 550; 165/14–16, 19, 22, 32, 34, 35, 39, 40; 236/93 R, 1 B, 1 C

[56] References Cited

U.S. PATENT DOCUMENTS

| | | | |
|---|---|---|---|
| 4,527,246 | 7/1985 | Masson | 364/505 |
| 4,664,177 | 5/1987 | Edelstein | 165/34 |
| 4,877,519 | 10/1989 | Robey | 210/86 |
| 4,931,948 | 6/1990 | Parker et al. | 364/505 |
| 5,179,524 | 1/1993 | Parker et al. | 364/505 |

OTHER PUBLICATIONS

Donald P. Massa, "Ultrasonic Transducers and Control Modules" Report dated Feb. 18, 1986, pp. 1–19 plus Figures 1–22.

*Primary Examiner*—James P. Trammell
*Attorney, Agent, or Firm*—Blakely, Sokoloff, Taylor & Zafman

[57] ABSTRACT

Methods and apparatae for metering energy consumption in a mass transfer heat delivery system using acoustic signals. A first type of method uses the phase difference between two simultaneously generated acoustic signals to determine the flow rate of liquid through a station of the heat delivery system. A first transducer and second transducers are used to transmit the first and second acoustic signals, respectively, through the liquid in response to an applied drive signal. The drive signal is removed from the first and second transducers such that the first and second transducers may be used to detect the arrival of the second and first acoustic signals, respectively. A phase detector measures the phase difference between the two acoustic signals as detected by the first and second transducers. A second type of method uses time lag analysis. A first transducer is used to transmit an acoustic signal through the liquid towards a second transducer in response to an applied drive signal. The drive signal is removed from the first transducer such that the first transducer may act as a receiver. The first and second transducers are arranged relative to one another such that echoes bounce back and forth between the transducers. To overcome effects of the conversion delays of the transducers, the arrival times of echoes when performing the time lag analysis. Both the temperature of liquid and the flow rate of liquid may be determined using the time lag analysis method.

7 Claims, 18 Drawing Sheets

METHOD AND APPARATUS FOR MEASURING HEAT TRANSFER IN SMALL DIAMETER PIPES USING ACOUSTIC SIGNALS

BACKGROUND OF THE INVENTION

1. Field of the Invention

The present invention relates to the metering of energy consumption and more particularly to the metering of energy consumption using acoustic signals.

2. Background Information

For many communities around the world, the delivery of heat to buildings is done via the mass transfer of heated water. The water is heated at a central location, such as a co-generating electric power plant, and delivered to individual residences, apartment buildings, and places of business via a complex network of water pipes. Wherein each residence, apartment building, or place of business may have numerous stations such as radiators to which the heated water is delivered, metering of consumption typically occurs, if at all, only at the inlet for the building or location.

When the building receiving the heat is an apartment building, each heating station may be "owned" by a particular user or resident, and the actual amount of usage for each user may vary. Because individual usage is not determined, the average cost for heat is apportioned to residents of the apartment building, regardless of individual usage. For situations in which the building is not metered, apportioning of the cost may extend across all buildings served by a central generating plant. In economics, this type of cost sharing is known as "average cost pricing." A consequence of average cost pricing is that the individual user has little or no economic incentive to conserve heat because the individual user cannot appreciably affect the cost of his individual heating bill through conservation. This lack of incentive to conserve energy leads to wasted energy, and the related excess fuel consumption results in many environmental harms.

The amount of energy consumed by a particular station of a mass transfer heat delivery system over a given period time can be determined as a function of 1) the temperature differential between the input and the output of the station, 2) the cross-sectional area of the inlet pipe into the station, and 3) the flow rate of heated water through the pipe. The mathematical relationship is given by the following equation:

$$Q = cAV_f \Delta T_w,$$

wherein Q is the heat transferred, c is the specific heat of water, A is the cross-sectional area of the inlet pipe, $V_f$ is the velocity of flow, and $\Delta T_w$ is the temperature differential of the water at the input and outputs of the station. Wherein a liquid or gas other than water is used, the specific heat of that liquid or gas is substituted for the specific heat of water.

The cross-sectional area of the inlet pipe and the flow rate of heated water through the inlet pipe define the volume of heated water that passes through the station during the given period of time, and the temperature differential may be used to calculate the amount of energy transfer once the volume of the water is known.

Assuming that the cross-sectional area of the inlet pipe is fixed and known, all that remains is to determine both the temperature differential and the flow rate for the given period of time. Once determined, the temperature differential and the flow rate can be used to calculate the amount of heat consumed by the station during the given period of time. If the period of time is a fixed interval and the energy consumed over time by a station is continually monitored, the individual user may be incrementally charged for his energy consumption. This leads to a shift from "average cost pricing" to "marginal cost pricing," in which the individual user has an economic incentive to conserve energy, as conservation efforts have a direct and immediate effect on the amount the individual user pays for energy. "Marginal cost pricing" is also known as "incremental costing."

There are prior art systems that use acoustic signals to measure the rate of flow of a liquid through large diameter pipes. Such systems are useful, for example, for determining the flow rate through oil pipelines. Such systems are typically non-invasive, i.e. the systems are attached to an existing pipe without breaching the wall of the pipe. Acoustic signals are transmitted through the outer wall of the pipe by a first transducer and received at the outer wall of another portion of the pipe by a second transducer. The Doppler shift of the acoustic signal bouncing off particulates in the fluid or shifts in transit time are used to measure flow rates. The diameter of oil pipelines and the like are quite large, and attempts to modify prior non-invasive systems to measure flow rates in small diameter pipes such as those used for radiators have resulted in limited success. In heating applications, scale deposited on pipe walls typically thwarts measurement using prior art non-invasive systems.

SUMMARY OF THE INVENTION

Therefore, a method for metering energy consumption for liquid mass transfer delivery systems is desirable. By metering energy delivered to each heating station of a building, individual users may be billed incrementally based on individual consumption.

According to a first embodiment, a process for measuring a flow rate of water through a station of a mass transfer heat delivery system using the phase difference between a first acoustic signal and a second acoustic signal is disclosed. The process includes a step of providing a pipe for conveying water. The water flows through the pipe in a direction of flow. A first transducer and a second transducer are also provided, wherein the first and second transducers are mounted to sides of the pipe such that the first and second transducers are in contact with the water. The transducers are arranged such that the flight path along which the first and second acoustic signals travel between the first and second transducers has a directional component that is parallel to the direction of flow.

A drive signal is simultaneously applied to the first and second transducers. The first transducer generates the first acoustic signal in response to application of the drive signal, and the second transducer generates the second acoustic signal in response to application of the drive signal. The first acoustic signal propagates through the water along the flight path towards the second transducer, and the second acoustic signal propagates through the water along the flight path towards the first transducer. The drive signal is removed from the first and second transducers so that the first and second transducers may detect the acoustic signals. The first acoustic signal is detected by the second transducer, and the second acoustic signal is detected by the first transducer. When an acoustic signal is detected by a transducer, the transducer outputs a drive signal having the same frequency as the acoustic signal. The phase difference between the first and second acoustic signals is determined using the electric signals output by the transducers, and the flow rate of water through the station is calculated using the phase difference.

According to another embodiment, a process for measuring energy consumption of a station of a mass transfer heat delivery system using a flight time of an acoustic signal is disclosed. The process includes a step of providing a pipe for conveying water. The water flows through the pipe in a direction of flow. A first transducer and a second transducer are also provided, wherein the first and second transducers are mounted to the pipe such that the first and second transducers are in contact with the water. The transducers are arranged such that the flight path along which the acoustic signals travel between the first and second transducers has a directional component that is parallel to the direction of flow. The first and second transducers are arranged relative to one another such that echoes of the acoustic signal are reflected along the flight path back and forth between the first and second transducers. The times of arrival for the echoes are recorded and used in calculations to cancel the effects of conversion delays for the transducers.

When a drive signal is applied to the first transducer at a first time, the first transducer generates the acoustic signal. The acoustic signal propagates through the water towards the second transducer. The drive signal is removed from the first transducer so that the first transducer may be used to detect echoes of the acoustic signal. The acoustic signal is detected by the second transducer at a second time, and a first echo of the acoustic signal is reflected by the second transducer towards the first transducer. The first echo is detected by the first transducer at a third time, and a second echo of the acoustic signal is reflected by the first transducer towards the second transducer. The second echo is detected by the second transducer at a fourth time. The flight time is calculated by a local processor by averaging a first flight time and a second flight time, wherein the first flight time is equal to a time for the second echo to travel from the first transducer to the second transducer and the second flight time is equal to a time for the first echo to travel from the second transducer to the first transducer.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION 1.0 Introduction

According to the various embodiments described herein, acoustic signals are used to measure the energy consumption of a station of a mass transfer heat delivery system. "Mass transfer heat delivery systems" are those heat transfer systems that heat a mass and transfer the mass to a station wherein heat is transferred from the mass to the ambient air. Each station of the mass transfer heat delivery system may be metered using a similar metering arrangement such that each owner of a station of the mass transfer heat delivery system may be billed according to individual energy consumption.

Two types of measurement methods are described. For each type of measurement method, low Q piezoelectric transducers are used to generate and detect acoustic signals. A low Q transducer provides a relatively large window of frequencies around the resonant frequency of the low Q transducer whereby an acoustic or electrical signal having a frequency within the window can cause excitation of the low Q transducer. Transducers manufactured of other transducing materials may be equivalently used.

According to a first type of measurement method, a time lag analysis is undertaken wherein a single acoustic signal is generated at the beginning of a measurement cycle by a first transducer. The acoustic signal echoes back and forth between the first transducer and a second transducer. The time at which the original acoustic signal is generated by the first transducer, the time at which the original acoustic signal is received by the second transducer, and the time at which a transducer receives an echo of the original pulse are all recorded. These times may be used to determine the rate of flow through the inlet pipe of the station and the temperature of the water at the inlet pipe.

According to a second type of measurement method, the phase difference between two acoustic signals is measured to calculate the rate of flow through the inlet pipe. For the second type of measurement method, two short continuous wave acoustic signals are simultaneously generated in response to a driving signal. The phase difference of the two acoustic signals may be used to determine the rate of flow through the station.

For both types of methods, the signal that drives a transducer is applied for a short time at the beginning of a measurement cycle and then switched off. The echoes of the acoustic signal generated in response to the driving signal are allowed to die out before the next measurement cycle begins. By thus gating the drive signal, the acoustic signal that is received by a transducer may be unambiguously identified. When using continuous wave signals, it is difficult to so identify acoustic signals because a received acoustic wave signal is the sum of several echoes, including extraneous echoes in the system.

2.0 Heating System Overview

Figure 1:
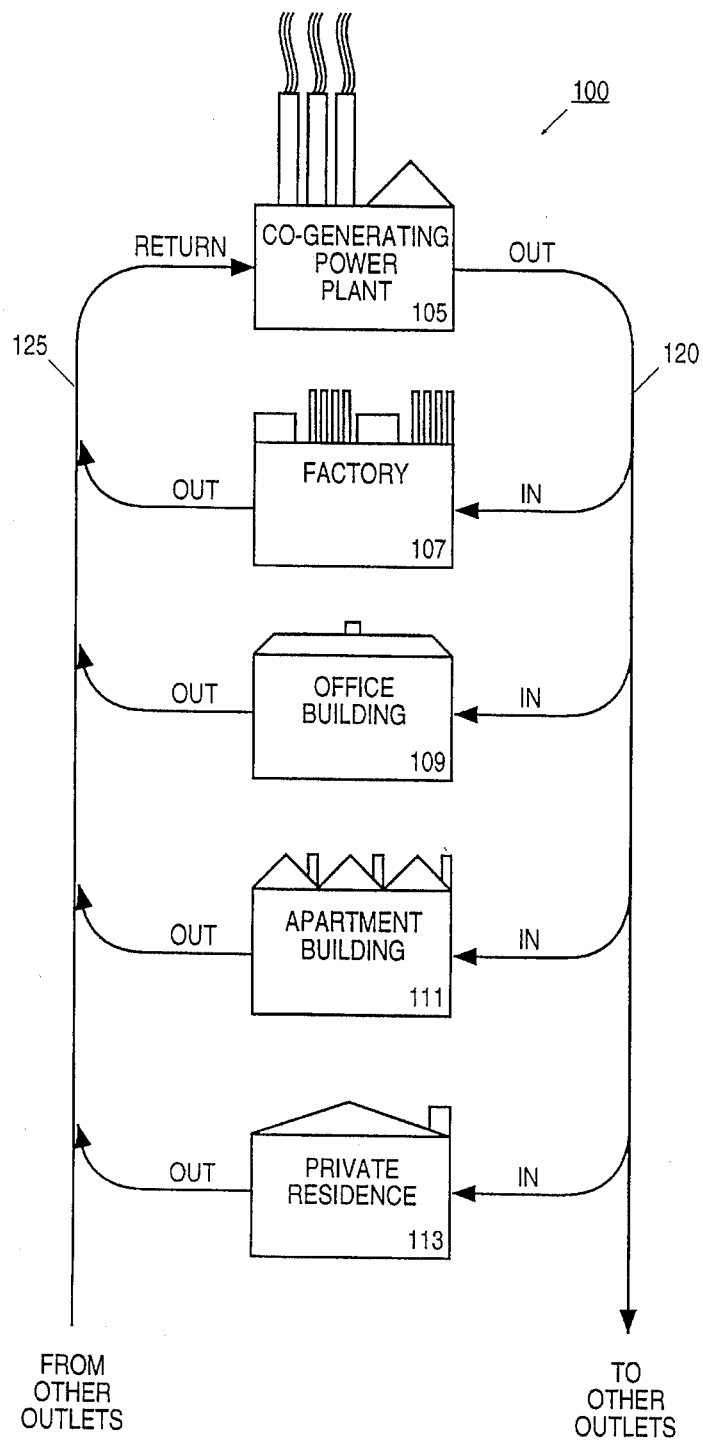
FIG. 1 shows a mass transfer heat delivery system according to one embodiment.

FIG. 1 shows a mass transfer heat delivery system 100. The mass transfer heat delivery system 100 includes an electric co-generating power plant 105 in which waste heat from the generators is used to heat water. Heated water is transferred via delivery pipeline 120 to "outlets" such as factory 107, office building 109, apartment building 111, and private residence 113. The outlets each include one or more "stations" such as radiators through which the heated water flows. Heat, and thus energy, is transferred from the water to the ambient air via the radiator, raising the temperature of the ambient air and cooling the water. The cooled water is returned to the co-generating power plant 105 for recycling and reheating via return pipeline 125.

Alternatively, the mass transfer heat delivery system may be comprised of a single outlet in which a furnace or heater located at the outlet heats the water. The water is circulated to the stations via pipes. Further, liquids other than water and gases may be used to transfer heat.

Figure 2:
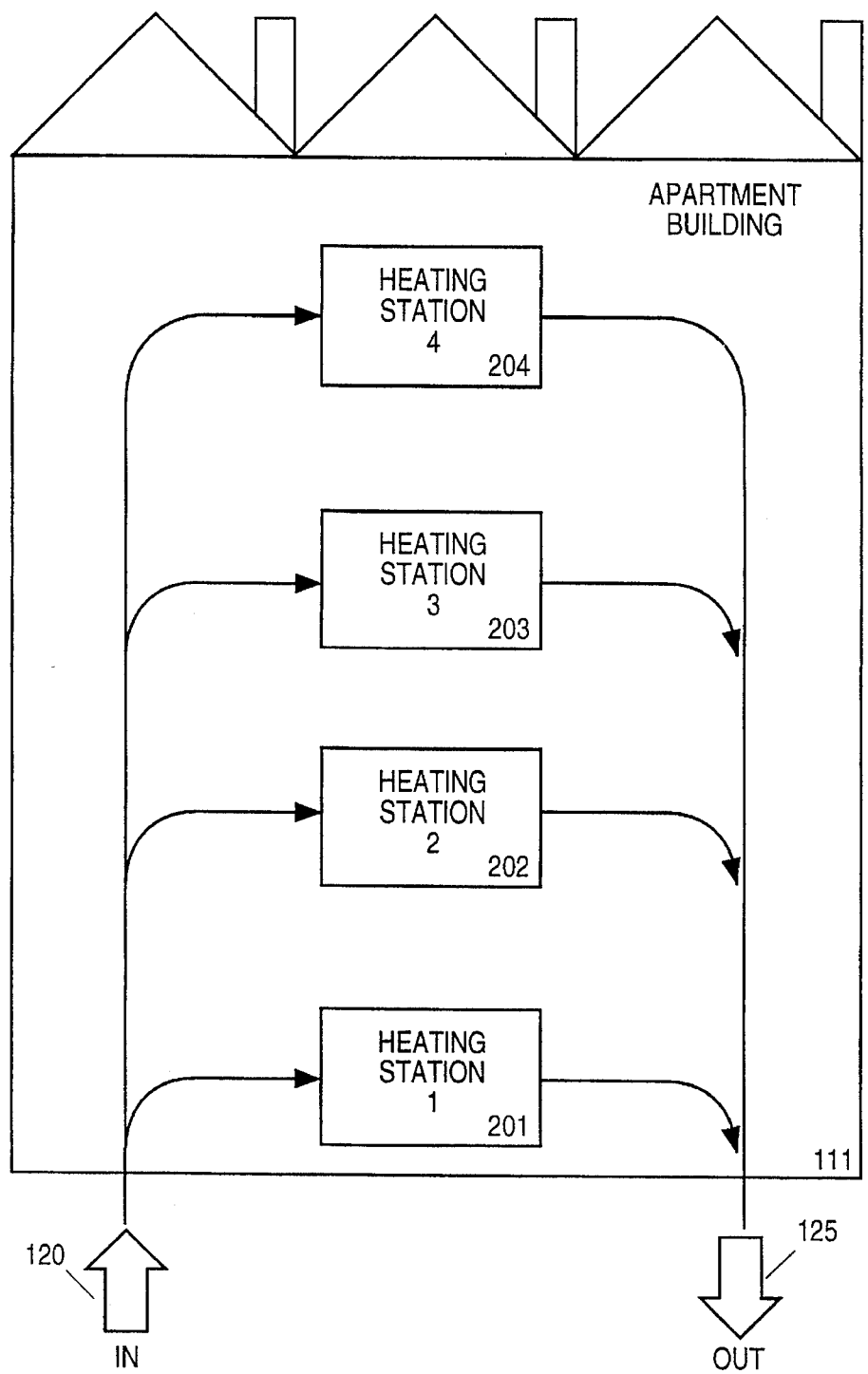
FIG. 2 shows an outlet of a mass transfer heat delivery system.

FIG. 2 shows one outlet of the mass transfer heat delivery system 100 in greater detail. Specifically, the apartment building 111 is shown as including a multiplicity of heating stations 201–204. For the purposes of illustration, it is assumed that each of the stations 201–204 is associated with a different resident of the apartment building 111. Under current metering systems, energy consumption may be measured on an outlet-by-outlet basis such that the total amount of energy consumed by an outlet is known. Such metering systems do not, however, account for differences in the amount of heat used by each station of an outlet. To encourage energy conservation, each station is provided with a metering apparatus for individually measuring energy consumption at each station.

Figure 3:
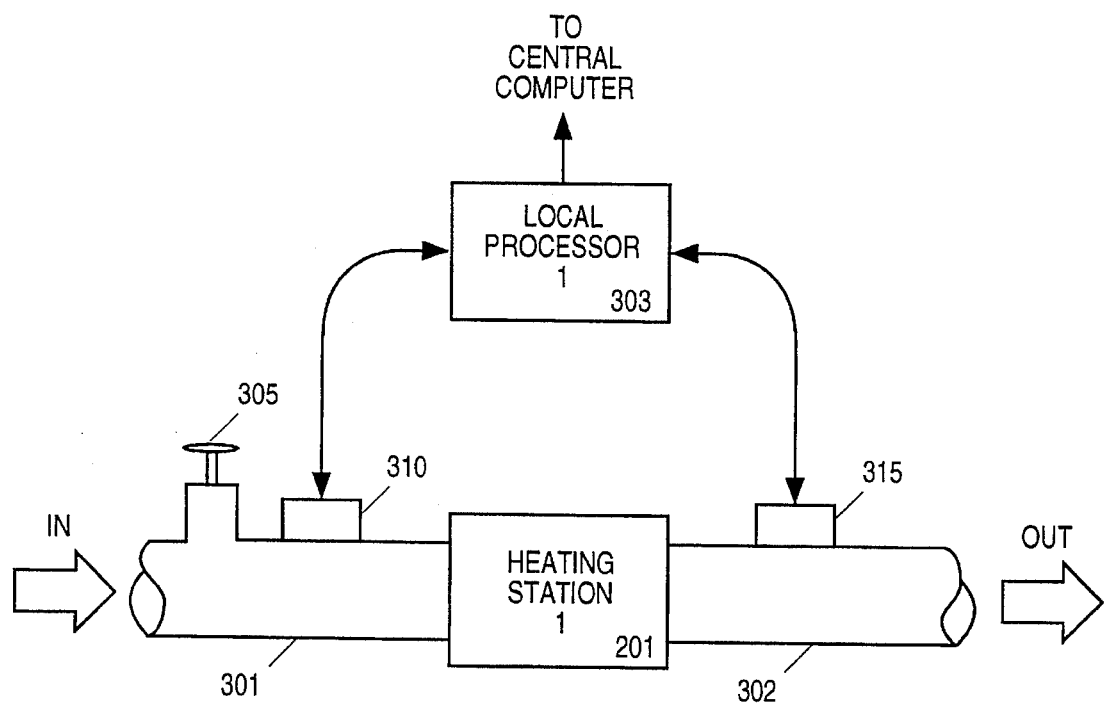
FIG. 3 shows a metering apparatus associated with a station of a mass transfer heat delivery system.

FIG. 3 shows a station incorporating a method and apparatus of the present embodiment. Station 201 of the apartment building 111 may be, for example, a radiator. Heated water is delivered to the station 201 via inlet pipe 301 for radiation of heat into the ambient air of the room in which station 201 is located. A valve 305 may be provided to allow the owner of the station 201 to adjust the rate of flow through the station 201, thereby allowing the owner of the station 201 to adjust the energy consumption of station 201. Heated water flows through the station 201 where heat is transferred from the water to the heat conducting pipe of the station 201 and the ambient air. The cooled water is removed from the station 201 via an outlet pipe 302. To simplify the following discussion, it is assumed that the amount of water that flows out of the station 201 via the outlet pipe 302 is equal to the amount of water that flows into the station 201 via the inlet pipe 301.

3.0 Metering Apparatus Overview

The metering apparatus of the present embodiment includes an inlet meter 310, an outlet meter 315, and a local processor 303. As discussed above, to calculate the energy consumption of the station 201 over a given period of time, the flow rate of heated water through the station 201 and the temperature differential of the water between the inlet pipe 301 and the outlet pipe 302 should first be determined. According to one embodiment, the inlet meter 310 includes devices and circuitry for measuring both the temperature of water at the inlet pipe 301 and the rate of flow through the inlet pipe 301. The outlet meter 315 is configured to measure only the temperature of the water at the outlet pipe 302. Of course, if the amount of water that flows out of the station 201 can differ from the amount of water that flows into the station 201, the outlet meter 315 also includes devices and circuitry for measuring the rate of flow through the outlet pipe 302.

Figure 5A:
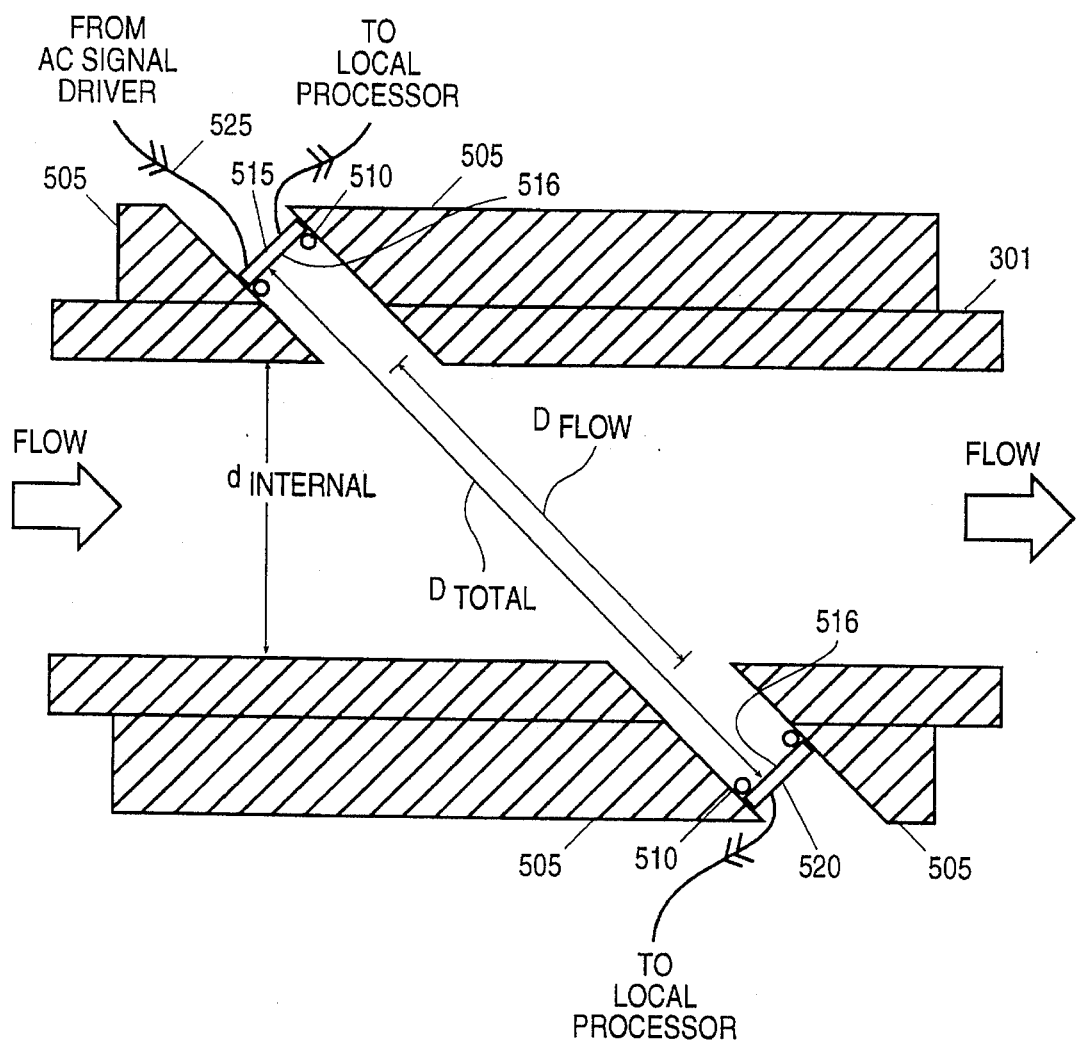
FIG. 5A shows the mechanical configuration of an inlet meter according to one embodiment.
Figure 5B:
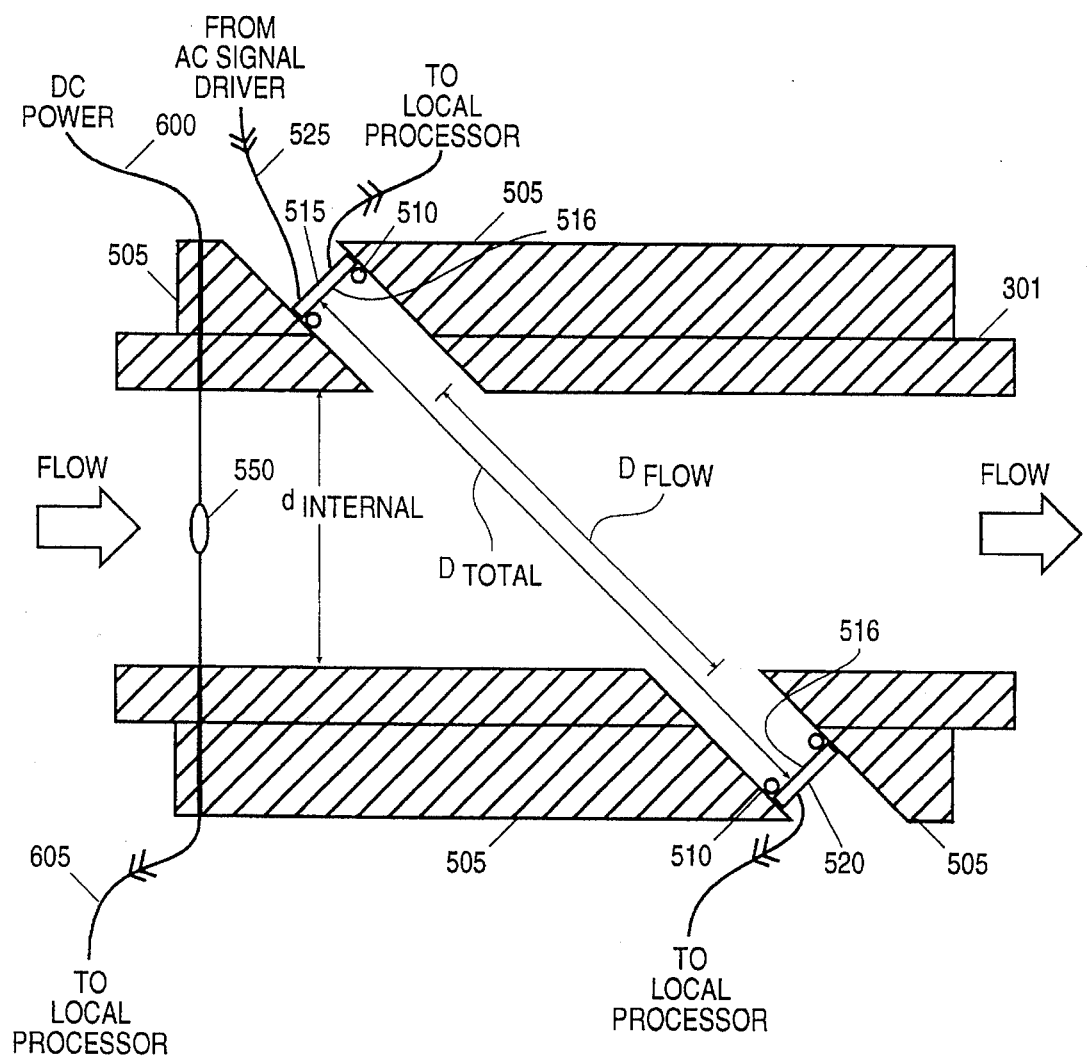
FIG. 5B shows the mechanical configuration of an inlet meter according to another embodiment.

According to each of the various embodiments described herein, the inlet meter 310 includes a set of transducers (as shown in FIGS. 5A and 5B) for generating acoustic signals that propagate through the water in the inlet pipe 301. The set of transducers are also for indicating the detection of acoustic signals by generating electrical signals. These electrical signals are used by the local processor 303 to determine the flow rate of water through the station 201. The same electrical signals may also be used to determine the temperature of the water at the inlet pipe 301. Alternatively, a thermistor (as shown in FIG. 5B) may be used for the temperature measurement. The outlet meter 315 may also include a transducer set.

The local processor 303 is coupled to receive electrical signals from the inlet and outlet meters 310 and 315. The local processor 303 uses the electrical signals received from the inlet and outlet meters 315 to determine the flow rate and temperature differential. The local processor 303 may include circuitry for making calculations using the electrical signals, or the local processor 303 may alternatively include or utilize look-up tables that store information regarding the temperature and flow rate. The information stored in the look-up tables may be calculated using equations described below and may be calibrated to account for such things as salinity, pressure, and temperature. The local processor temporarily stores the results of the determinations and forwards the results to a central computer of the outlet on demand or at predetermined intervals. The local processor 303 may be an analog or digital signal processor.

4.0 Metering System Overview

Figure 4:
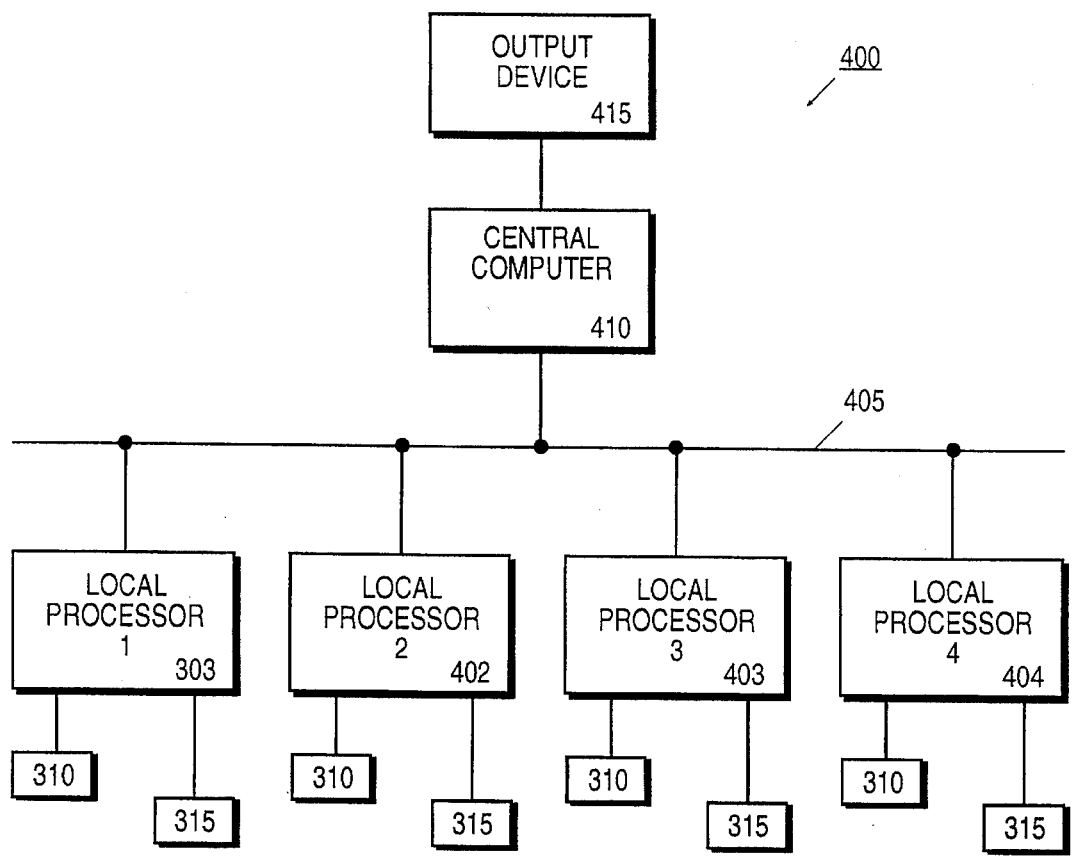
FIG. 4 shows a metering network for determining individual billing based on individual energy consumption as determined by the metering apparatus.

FIG. 4 shows a metering system for an outlet. The metering system 400 includes a local processor and inlet and outlet meters for each station of the outlet. The local processors 303, 402 403, and 404 communicate with the central computer 410 of the metering system 400 via the network link 405. Although each local processor is shown as servicing only one set of inlet and outlet meters 310 and 315, a single local processor can service more than one set of inlet meters 310 and 315, and thus more than one station. Having a single local processor controlling multiple stations is advantageous when all of the stations are owned by the same user.

The metering system 400 may be implemented as a control network such as those sold by Echelon Corporation of Palo Alto, Calif. Such control networks are known as "LONs." For such a case, the network link 405 may be a serial link such as coaxial cable, twisted pair wire, or optical fiber. Alternatively, the local processors 303, 402, 403, and 404 may communicate with the central computer 410 using infrared or radio transmissions, and no physical serial link 405 is provided. The local processors include mechanisms for communication between the local processors and other processors on the control network 405. Any commercially available control network may be used.

According to one embodiment, the pipes of the heat delivery system can be used as the network link 405. Communication between the local processors and the central computer 410 of the outlet is accomplished using acoustic signals. An acoustic transmitter is located in the outlet pipe 302 for each station. The frequency of the acoustic signals should be relatively low to reduce the attenuation due to the filtering effects of the water, but not so low as to be audible by humans. Digital communication may be done using pulse code modulation or any equivalent alternative method. Identification of individual stations may be accomplished using a coding scheme wherein a "header" at the beginning of a "frame" of information identifies the transmitting station, or each station of an outlet may be tuned to have its own identifying frequency. Delivery of flow rate and temperature differential information may be done using any reasonable "frame" format that allows the central computer 410 to distinguish between flow rate data and temperature differential data.

To communicate with the custodian of the outlet or the mass transfer heat delivery system, an output device 415 is provided. The output device 415 may be, for example, a printer or display device located at the outlet. Alternatively, the output device 415 may simply be a radio transmitter which the custodian monitors with an appropriate radio receiver. The output device 415 may also be located at a central location for monitoring several outlets simultaneously.

5.0 Time Lag Analysis Measurement Method and Apparatus

As mentioned previously, one type of measurement method is time lag analysis, in which the time it takes an acoustic signal to travel through water between a first transducer and a second transducer is determined. This time is known as the "time of flight." Given the characteristics of water as a transmission medium for acoustic signals, both the temperature of the water and the flow rate of water can be determined.

Various factors can affect the time of flight measurement. These factors include the conversion delays of the transducers, the temperature of the water, the flow rate of the water, the salinity of the water, the density of the water, the viscosity of the water, and turbulence. The affects of salinity, density, viscosity, and turbulence may be accounted for through appropriate calibration that is reflected in the look-up tables used by the local processor 303. The effects of conversion delays, temperature, and flow rate may be overcome by careful selection of the data used for calculating the time of flight.

5.1 Meter Mechanical Configuration

FIGS. 5A and 5B show different mechanical configurations of an inlet meter 310 within the inlet pipe 301. The mechanical configurations of the inlet meter 310 shown in FIGS. 5A and 5B may be used to measure the energy consumption of the station using time lag analysis.

In FIG. 5A, the inlet meter 310 is shown as including a minimally invasive transducer set comprised of a first transducer 515 and a second transducer 520. The first and second transducers 515 and 520 are piezoelectric crystals that produce electrical signals in response to receiving acoustic signals of an appropriate frequency. Similarly, the first and second transducers 515 and 520 produce acoustic signals in response to a driving electrical signal of the appropriate frequency.

The local processor 303 is coupled to receive the electrical signals output by the transducers. For the inlet meter 310 of FIG. 5A, the electrical signals output by the first and second transducers 515 and 520 are monitored by the local processor 303 to determine flow rate and the temperature at the inlet pipe 301. The outlet meter 315 is identical to the inlet meter 310, but the local processor 303 need only determine the temperature at the outlet pipe 302. If there is a difference between the amount of water that flows into the station and the amount of water that flows out of the station, the transducer set of outlet meter 315 is also used to measure the flow through the outlet pipe 302.

In FIG. 5B, the inlet meter 310 includes a thermistor 550 in addition to the first and second transducers 515 and 520. The transducer set is used to measure flow rate, and the thermistor 550 is used to measure temperature. The thermistor 550 is placed in the flow of water and near the flight path of acoustic signals between the transducers 515 and 520. The resistance of the thermistor 550 varies with temperature, and the resistance is monitored by the local processor 303 to determine the temperature of the water at the inlet pipe 301. For this embodiment, the outlet meter 315 includes a thermistor and no transducer set. If there is a difference between the amount of water that flows into the station and the amount of water that flows out of the station, the inlet and outlet meters 310 and 315 may be identical, assuming that there is not a waterfall in the outlet pipe 302. If there is a waterfall such that the outlet pipe 302 is not filled with water, a thermistor may be placed at the bottom of the waterfall or wherever the thermistor is constantly submerged in water.

As shown in FIGS. 5A and 5B, holes are drilled at an angle into the inlet pipe 301 to mount the minimally invasive transducer set. The first and second transducers 515 and 520 are fitted onto the inlet pipe 301 and into the holes by the transducer mounts 505, which may be strapped on, glued on, or welded onto the inlet pipe 301. Alternatively, transducers are mounted on in-line mountings. The transducer mounts 505 are machined and fitted such that the interior volume of the cylinder holding each transducer is known. When attached to the inlet pipe, the interior volumes of the cylinders holding each transducer is filled with water such that the transducers are in direct contact with the water that flows through the station 201; however, the transducers are not placed in the flow.

The mechanical configurations of FIGS. 5A and 5B imply a horizontal flow. If an inlet or outlet meter is connected to a vertical section of pipe wherein the direction of flow is substantially vertical through the pipe, the transducers are mounted at the edge of the flow stream to better avoid trapping air at the transducer faces, which could result in the interruption of acoustic signal transmission. Thus, for the case of vertical flow, the volume of the cylinders holding the transducers and the total path length between the transducers may be much reduced when compared to meters for horizontal flow.

The transducer mounts 505 are manufactured of the same material as the inlet pipe 301, or by a material having a similar coefficient of thermal expansion as the material of inlet pipe 301 such that calculations accounting for thermal expansion may be more easily performed. The faces 516 and 521 of the first transducer 515 and second transducer 520, respectively are recessed into the wall of the inlet pipe 301 to minimize disturbance of the flow of liquid through the inlet pipe 301. If a transducer set is used in the outlet meter 315, the outlet transducer set is similarly positioned within the outlet pipe 302.

An 0-ring seal or washer 510 is provided with each transducer mount 505 to prevent leakage of the liquid from the inlet pipe 301. Acoustic signals that are generated by a first transducer propagate in a direction normal to the face of the first transducer, and the face of the second transducer is positioned directly in the path of an acoustic signal generated by the first transducer. For example, when the first transducer 515 generates an acoustic signal in response to a driving signal, the acoustic signal propagates in a direction normal to the face 516 of the first transducer 515. The face 521 of the second transducer 520 is positioned directly across from the face 516 of the first transducer 515 such that the acoustic signal generated by the first transducer 515 is received by the second transducer 520. This configuration of the transmitting and second transducers 515 and 520 allows an acoustic signal to echo back and forth between the transducers. The use of echoes to measure flow rate and temperature are discussed in more detail below.

Wherein the diameter of the inlet pipe 301 may vary from station to station, it is useful to keep the total path length between transducers $D_{total}$ fixed regardless of pipe diameter to allow the use of a single processor program for the local processor 303. This may be accomplished by determining the maximum possible diameter of an inlet pipe 301 and defining the total path length $D_{total}$ to ensure correct operation within the maximum diameter inlet pipe 301. The same path length $D_{total}$ can be achieved in smaller diameter pipes by using thicker transducer mounts 505. This results in acoustic signals traveling out of the flow for a greater portion of the path length, $D_{total}$.

5.2 Meter Electrical Circuits

Figure 6A:
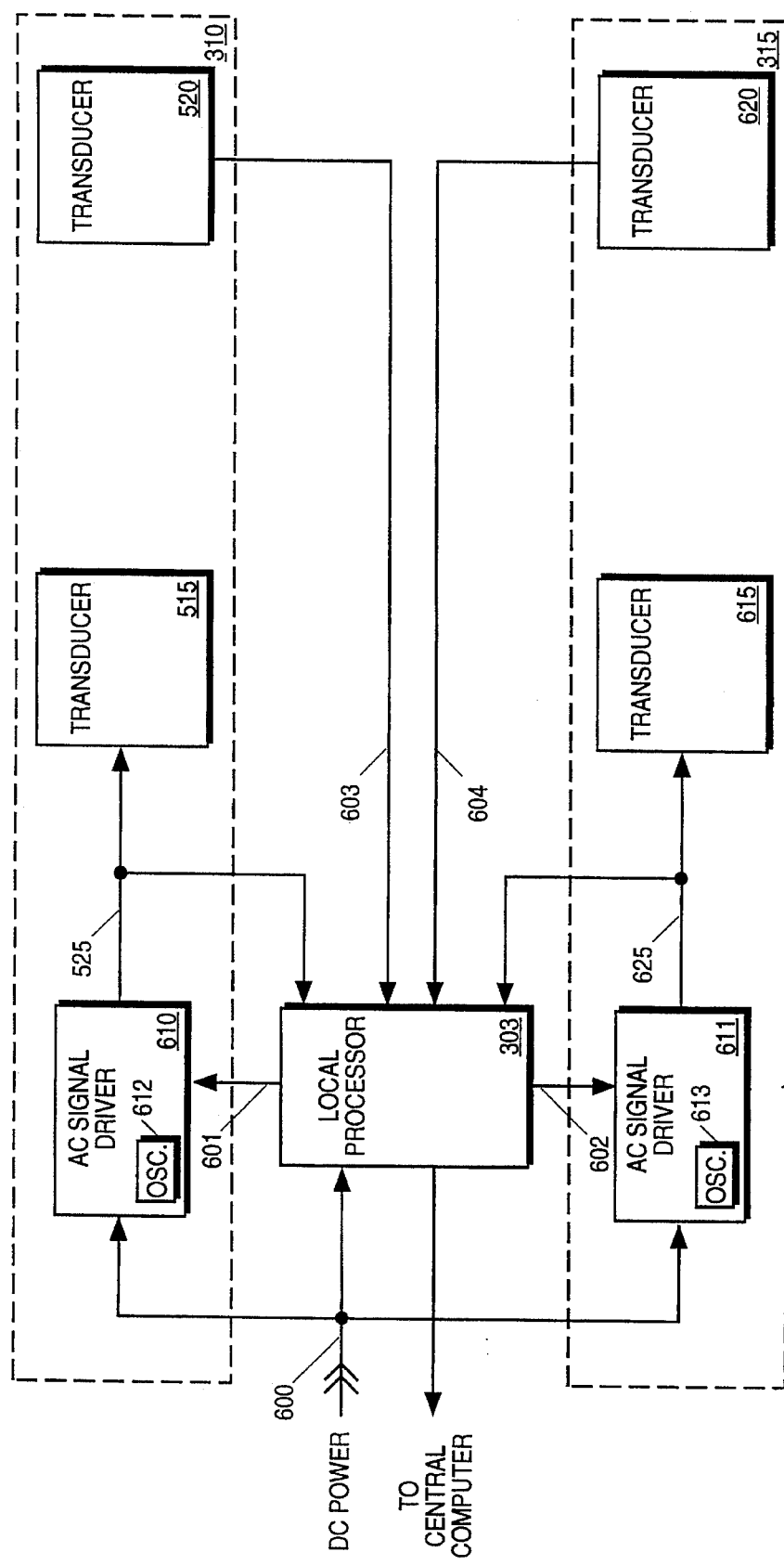
FIG. 6A shows an electrical circuit for an inlet meter according to FIG. 5A.

FIG. 6A shows an electrical circuit for a metering apparatus that includes an inlet meter 310 according to FIGS. 5A. DC power is supplied to the local processor 303, the inlet meter 310, and the outlet meter 315 via DC power line 600. Alternatively, the DC voltage may be generated internally by the local processor 303 and supplied to the other components via DC power line 600. The DC power line 600 may provide a single DC voltage of 5 volts. Alternatively, DC power line 600 may include three separate power lines for providing three different DC voltages, one or all of which may be provided to the local processor 303, the inlet meter 310, and the outlet meter 315. For example, the voltages may be −15 volts, +5 volts, and +15 volts.

Because the faces of the transducers are in touch with the water, a relatively low (e.g., below 100 mA) drive may be used to drive the transducers. With the requirement of a relatively low driving signal, it becomes practical to supply power to the transducers through the use of acoustic energy. For example, the DC power may be provided by a battery located at the station. The battery may be charged using a charging transducer having a different resonant frequency than the transducers of the transducer set. A large amplitude, low frequency (e.g. 50 kHz) signal transmitted by a transmitter controlled by the central computer 410 is received by the charging transducer of the station, which is tuned to the frequency of the acoustic signal. The electrical signal output by the charging transducer in response to the acoustic signal charges the battery. The charging transducer may be located in either the inlet pipe 301 or the outlet pipe 302. However, as transducers may be temperature sensitive and may be affected by high operating temperatures in some installations, the charging transducer should be located in the outlet pipe 302.

Each of the inlet and outlet meters 310 and 315 are shown as including a transducer set for detecting the receipt of acoustic signals in the inlet pipe 301 and the outlet pipe 302, respectively. The transducer set of inlet meter 310 includes the first transducer 515 and the second transducer 520. The transducer set of outlet meter 315 includes a third transducer 615 and a fourth transducer 620.

The inlet meter 310 also includes an AC signal driver 610 for supplying an AC drive signal to the input of the first transducer 515 for a predetermined duration in response to an active control signal supplied by the local processor 303 via control line 601. Similarly, the outlet meter includes an AC signal driver 611 for supplying an AC drive signal to the input of the third transducer 615 in response to an active control signal supplied by the local processor 303 via control line 602. The AC signal drivers 610 and 611 include oscillators 612 and 613, respectively, for defining the frequency of the driver signals.

When the control signals supplied to the AC signal drivers 610 and 611 are in an inactive state, the power lines 525 and 625 function as signal lines for transmitting signals output by the first and third transducers 515 and 615, respectively. The function of the AC signal drivers 610 and 615 may be performed using voltage supplies or current sources.

The local processor 303 is coupled to receive the electrical signals output by the transducers 515, 520, 615, 620 via signal lines 525, 603, 625, and 604, respectively. The electrical signals output by the transducers and the AC signal drivers are analog signals. Conversion of the analog signals to a digital form is not required if the local processor 303 performs analog signal processing. If the local processor 303 is a digital signal processor, the local processor 303 either should include circuitry for analog-to-digital conversion or analog-to-digital converters should be interposed between the outputs of the transducers and the inputs of the local processor 303.

During each measurement cycle, the local processor 303 records the times that the AC drive signal is applied to the first and third transducers and the times when acoustic signals are received by a transducer. By using time lag analysis, the local processor 303 determines the flow rate of water and the temperature differential between the inlet and outlet pipes 301 and 302 for each measurement cycle. The measurement of flow rate and temperature differential using time lag analysis is discussed in detail below. The local processor 303 stores the information determined for each measurement cycle and conveys such information to the central computer when required.

Figure 6B:
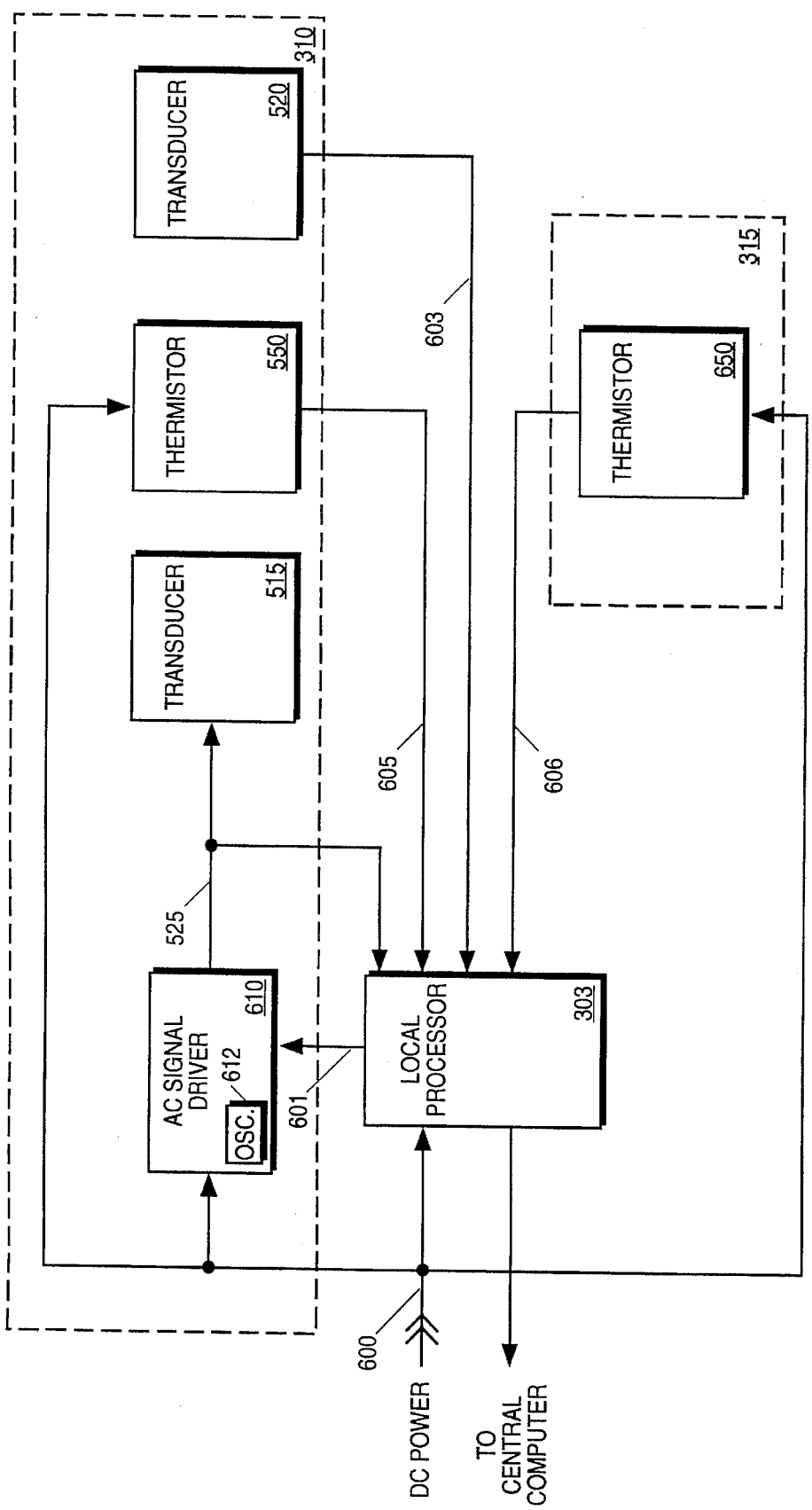
FIG. 6B shows an electrical circuit for an inlet meter according to FIG. 5B.

FIG. 6B shows an electrical circuit for a metering apparatus that includes an inlet meter 310 as shown in FIG. 5B. As shown, the inlet meter 310 includes the AC signal driver 610, the first transducer 515, the second transducer 520, and the thermistor 550. The outlet meter 315 includes a second thermistor 650.

The transducer set of the inlet meter 310 operate substantially as described above with respect to FIG. 6A. The local processor 303, however, only uses the outputs of the transducer set to determine the flow rate of water through the inlet pipe 301. The local processor 303 determines the temperature of the water in the inlet pipe 301 using the electrical signal output by the thermistor 550 via signal line 605. The thermistor 550 is coupled to receive DC power via DC power line 600. It may be necessary to reduce the voltage across the thermistor 550. This may be done by coupling a voltage divider circuit in series with the thermistor 550. Further, it may be necessary to define the voltage swing at the terminal of the thermistor 550 that is coupled to the local processor 303. This may be done by coupling the first terminal of a resistor at the node defined by the thermistor 550 and the input pin of the local processor and coupling the second terminal of the resistor to ground.

The outlet meter 315 is shown as only including thermistor 650, which is also coupled to DC power line 600. The local processor 303 receives the output of thermistor 650 via signal line 606. The same considerations discussed with respect to thermistor 550 apply to thermistor 650. The output signals of the thermistors 550 and 650 are also analog signals, and analog-to-digital conversion should be provided if the local processor 303 is a digital signal processor.

5.3 Meter Operation

Returning to FIG. 5A, when a piezoelectric transducer is coupled to a drive signal of the appropriate frequency, the piezoelectric transducer outputs an acoustic signal at the frequency of the drive signal. Each transducer has both a resonant frequency and an anti-resonant frequency. Typically, as receivers, the open circuit sensitively of transducers is at a maximum at the anti-resonant frequency. Conversely, the acoustic output of a transducer is typically greatest when the drive signal is at the resonant frequency. According to one embodiment, the drive signal is selected to have a frequency near the anti-resonant frequencies of the transducer. However, the drive signal may be driven at or near either of the resonant or anti-resonant frequencies. Piezoelectric transducers are commercially available from Stevenley Sensors, Inc., of East Hartford, Conn. For this embodiment, each of the transmitting and second transducers 515 and 520 have a nominal operating frequency of 2.2 MHz.

To generate an acoustic signal, the local processor 303 causes an AC drive signal to be applied to the first transducer 515 via power line 525. The amount of time that the AC drive signal is applied to the first transducer 515 determines the duration of the acoustic signal output by the first transducer 515.

To generate an "acoustic burst" signal having a duration of one or more full periods of the resonant frequency, the AC drive signal is applied to the first transducer 515 for an amount of time equal to the desired duration and then removed. The amount of time that the AC drive signal is applied may be varied to vary the duration of the acoustic burst. To ensure that the transducer 515 may act both as a transmitter of the acoustic burst signal and as a receiver to detect echoes of the transmitted acoustic burst signal, the duration of the acoustic burst signal should be less than twice the calibration flight time, which is the time it takes for an acoustic signal to travel between the first transducer 515 and the second transducer 520 in the absence of flow and at room temperature. The calibration flight time may be easily calculated, as both the velocity of an acoustic signal through water at room temperature and the total path length are known.

When the AC drive signal is applied to the first transducer 515 via the power line 525, an acoustic burst signal having the frequency of the AC drive signal is generated by the first transducer 515 and propagated through the water of inlet pipe 301 towards the second transducer 520. The water acts as a filter that attenuates the acoustic signal output by the first transducer 515, and the attenuation should be accounted for by generating an acoustic signal having sufficient amplitude. The frequency of the acoustic burst signal is not altered.

The anti-resonant frequency of the second transducer 520 is near the frequency of the acoustic signal such that receipt of the acoustic signal causes the excitation of the second transducer 520, resulting in the second transducer 520 outputting a current. This current may be detected and recorded by the local processor 303. The precise operating frequency of the transmitting and second transducers 515 and 520 are not limited to the disclosed value, but the transmitting and second transducers 515 and 520 should be tuned to have the same operating frequency.

An advantage of using transducers to measure temperature is that the time constant for registering temperature changes is much smaller than for alternative devices, such as thermistors. The full effect of a change in velocity is obtained in the time it takes for an acoustic signal to traverse the flight path the requisite number of times.

5.4 Theory Of Operation—Echoes and Time of Flight

According to one method for using the transducer set shown in FIGS. 5A and 5B, time lag analysis is used to determine both the flow rate of water through the station 201 and the temperature differential of the water at the inlet pipe 301 and at the outlet pipe 302. Because the flight path between the first and second transducers cuts diagonally across the flow path of water, a first acoustic signal traveling from the first transducer 515 to the second transducer 520 will arrive in less time than it takes for a second acoustic signal to travel from second transducer 520 to the first transducer 515. This is because the velocity of flow $V_f$ adds to the total velocity for the first acoustic signal, wherein the velocity of flow $V_f$ subtracts from the total velocity for the first acoustic signal. The velocity and direction of flow $V_f$ may be determined by taking the difference between the first flight time $t_{f1}$, which is the time it takes an acoustic signal to travel from the first transducer 515 to the second transducer 520, and the second flight time $t_{f2}$, which is the time it takes an acoustic signal to travel from the second transducer 520 to the first transducer 515.

The velocity of sound $V_s$ through water is a non-linear function of the temperature of the water through which the sound travels. Thus, the temperatures at the inlet and outlet pipes 301 and 302 may be calculated by first calculating the velocity of sound $V_s$ at each of the inlet and outlet pipes. This may be done by calculating the average of the first and second flight times. When the first and second flight times are averaged, the effects of the velocity of flow $V_f$ are eliminated such that the velocity of sound $V_s$ is determined independently of the velocity of flow $V_f$. The calculation of the temperature of water once the velocity of sound $V_s$ is determined may be complicated by the fact that temperature is a double-sided function of $V_s$. This is discussed in more detail below.

One concern of using piezoelectric transducers to measure flight times in small diameter pipes is that the conversion delays of the transducers must be explicitly considered in determining the flight time between transducers. If unaccounted for, conversion delays can skew results and lead to incorrect determinations of flight times.

To reduce the effects of the conversion delay of the transducers, the echoes of a transmitted acoustic signal are used to measure flight time between transducers. An acoustic signal of sufficient amplitude can echo several times, wherein each echo is detectable by the transducer that receives it. Wherein the echoes may pass through one another on the flight path, the flow velocities found in heating pipes such as inlet pipe 301 are in a region wherein linear differential equations apply. By application of the principal of superposition for linear differential equations, the echoes are independent of one another and do not affect the frequency or energy of echoes that are encountered on the flight path.

During operation of the transducer set of the inlet meter 310, an AC drive signal is applied is applied to the first transducer 515 for a predetermined duration by the AC signal driver 610. After a conversion delay inherent in the transmitting transistor 515, the transmitting transistor 515 generates an acoustic signal that is propagates through the water towards the second transducer 520. When the second transducer 520 receives the acoustic signal, a portion of the energy of the acoustic signal is reflected as an echo back towards the first transducer 515. Because the resonant frequency of the second transducer 520 is near the frequency of the acoustic signal, the second transducer 520 resonates, which is detected as a voltage by the local processor 301 after another conversion delay of the second transducer 520. If the calculation of the flight time between transducers ends after the initial acoustic signal is received, the measured flight time is actually the flight time plus the conversion delays for the transmitting and second transducers 515 and 520. This is unacceptable.

As stated previously, an echo of the acoustic signal is reflected back towards the first transducer 515. The echo has a reduced amplitude with respect to the original acoustic signal, but the frequency of the echo does not degrade appreciably. Therefore, the echo is detectable by the first transducer 515. As discussed previously, the AC drive signal should be removed from the first transducer 515 before the first echo is received by the first transducer 515 such that the first transducer 515 may be used to detect the first echo. When the AC drive signal is removed from the first transducer 515 and the AC signal driver 610 is switched off, the AC signal driver 610 presents a high impedance. The first transducer 515 may then be used to detect the receipt of echoes of the acoustic signal.

When the echo from the second transducer 520 is received, a second echo is reflected back towards the second transducer 520. The second echo has a reduced amplitude compared to the first echo, but the frequency of the second echo remains that of the initial acoustic signal signal. When the second echo is received, the second transducer 520 outputs an electrical signal, which is detected after the propagation delay of the second transducer 520. By using the first flight time as given by the time between the receipt of the first echo and the receipt of the second echo and the second flight time as given by the time between the receipt of the acoustic signal and the first echo, the average flight time can be calculated while effectively eliminating the conversion delays of the transducers. Wherein the amplitude of the echoes diminish over time, the frequency of the echoes remains stable over time such that the transducers are appropriately stimulated.

Figure 7:
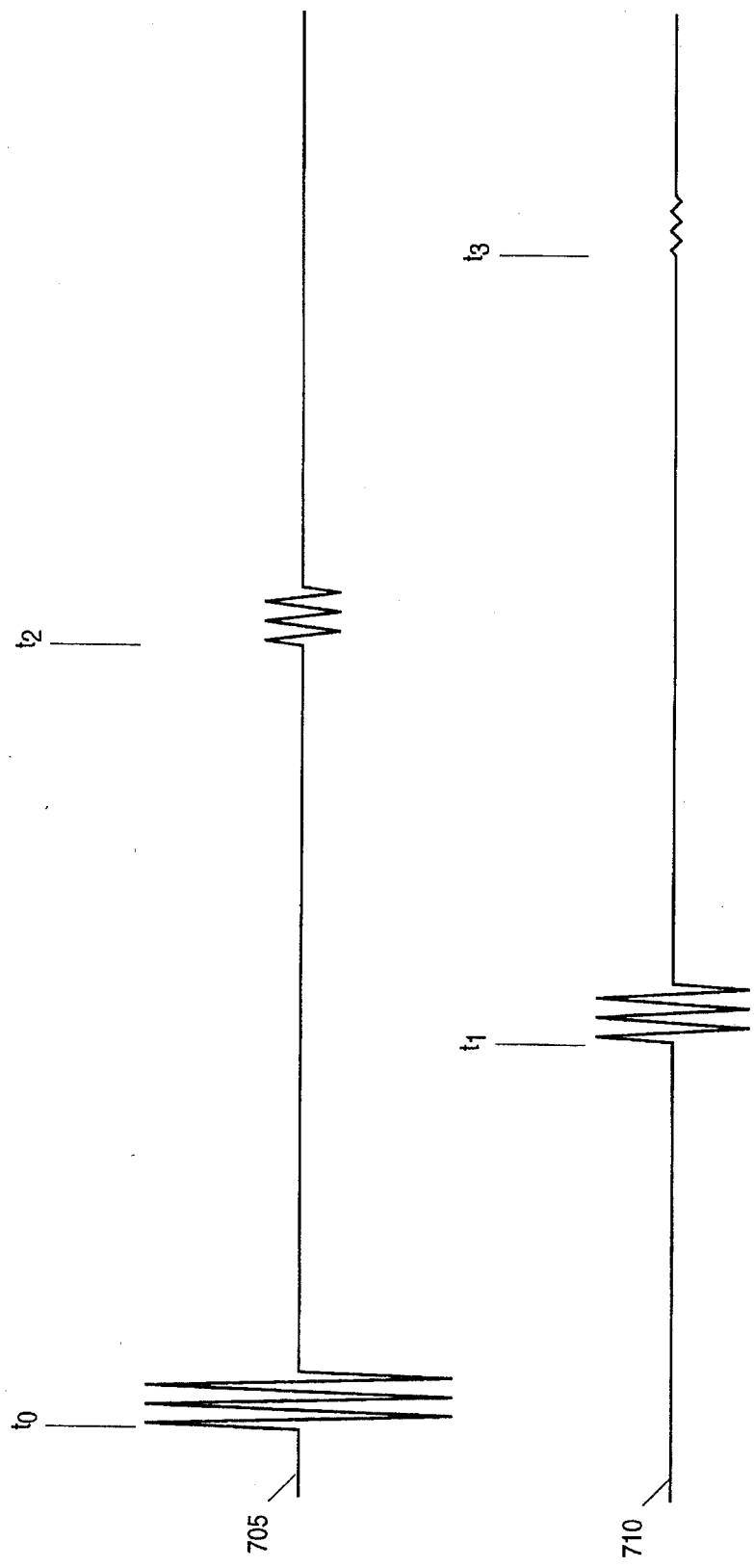
FIG. 7 shows the electrical outputs of the first and second transducers of an inlet meter.

FIG. 7 shows the electrical signals output by the first transducer 515 and the second transducer 520 as detected by the local processor 303. Waveform 705 is the waveform for first transducer 515, and waveform 710 is the waveform for second transducer 520. At time t0, a AC drive signal is applied to the first transducer. The local processor detects this event because the local processor is coupled to the first transducer at the same node as the current source. At time t1, after a conversion delay, the second transducer 520 outputs an electrical signal in response the receipt of the acoustic burst signal sometime after a conversion delay. The resulting electrical signal is shown on waveform 710. Note that the amplitude of the electrical signal output by the second transducer is much diminished when compared to that of the initial AC drive signal applied to the transmitting transducer 515 at time t0.

At time t2, after a conversion delay, the first transducer 515 resonates in response to the receipt of the first echo, producing an electrical signal that is detected by the local processor 303. The resulting electrical signal is shown on waveform 705. At time t3, after a conversion delay, the second transducer 520 begins to resonate in response to the receipt of the second echo. The resulting electrical signal is shown on waveform 710. The sum of the first and second flight times may be calculated by subtracting the time between the receipt of the original acoustic signal from the time of receipt of the second echo, which eliminates the conversion delays of the transducers. The average flight time can thus be calculated independently of the conversion delays of the transducers.

Because only one transducer is needed to activate all the transducers in the set, the inlet meter 310 has relatively low power consumption. Further, since only a single acoustic burst is generated for each measurement cycle, the noise associated with the first transducer when driving an acoustic signal is reduced, and the signal-to-noise ratio of the of the system is enhanced.

Figure 8:
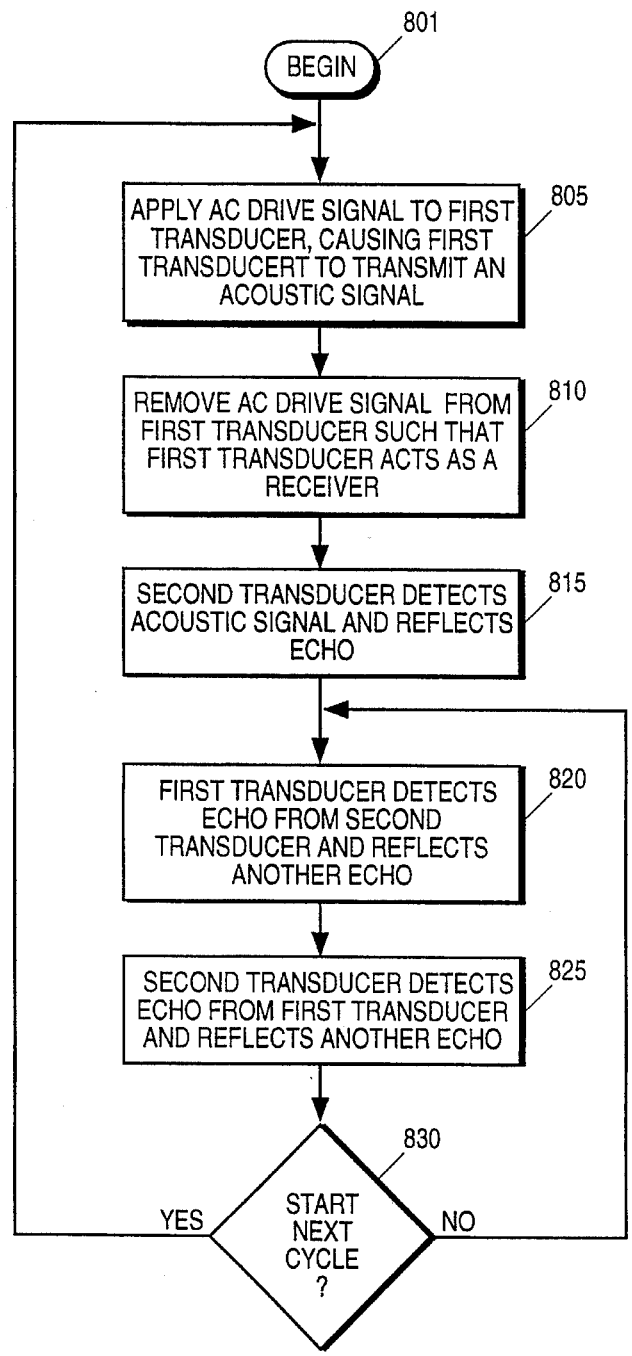
FIG. 8 is a flow chart illustrating the operation of an inlet meter that implements a phase difference measurement technique.

FIG. 8 is a flow chart showing the operation of a transducer set that implements a time lag measurement method. The process begins at process block 801. A measurement cycle is begun at step 805 when the AC drive signal is applied to the first transducer 515 such that the first transducer 515 transmits an acoustic signal through the water towards the second transducer 520. Process block 810 shows that the AC drive signal is removed from the first transducer 515 such that the first transducer 515 may be used to detect the echoes of the acoustic signal. While the placement of process block 810 implies that the AC drive signal is removed before the second transducer detects the acoustic signal at process block 815, the AC drive signal may, in fact, be removed at any time prior to receipt of the first echo by the first transducer 515.

At process block 815, the second transducer 520 detects the acoustic signal. An echo is reflected by the second transducer 520 towards the first transducer 515 a conversion delay before detection of the acoustic signal. The first transducer 515 detects the echo of the acoustic signal at process block 820. Another echo is reflected by the first transducer 515 towards the first transducer 520 a conversion delay before detection of the echo received from the second transducer 520. At process block 825, the second transducer 520 detects the echo reflected by the first transducer 515. Yet another echo is reflected by the second transducer 520 towards the first transducer 515 a conversion delay before detection of the echo received from the first transducer 515. Echoes continue to be reflected back and forth between the first and second transducers 515 and 520 with rapidly decreasing amplitude. The echoes are allowed to diminish to near undetectable levels, at which time it is determined at decisional block 830 that the next measurement cycle is to begin. The process begins again at process block 805. Otherwise, process blocks 820 and 825 are repeated until the beginning of the next measurement cycle. The electrical signals output by the transducers in response to the echoes may continue to be monitored so long as an electrical signal with a useful signal-to-noise ratio is obtained.

5.5 Applying Time of Flight Measurement to Measure Temperature

Figure 9:
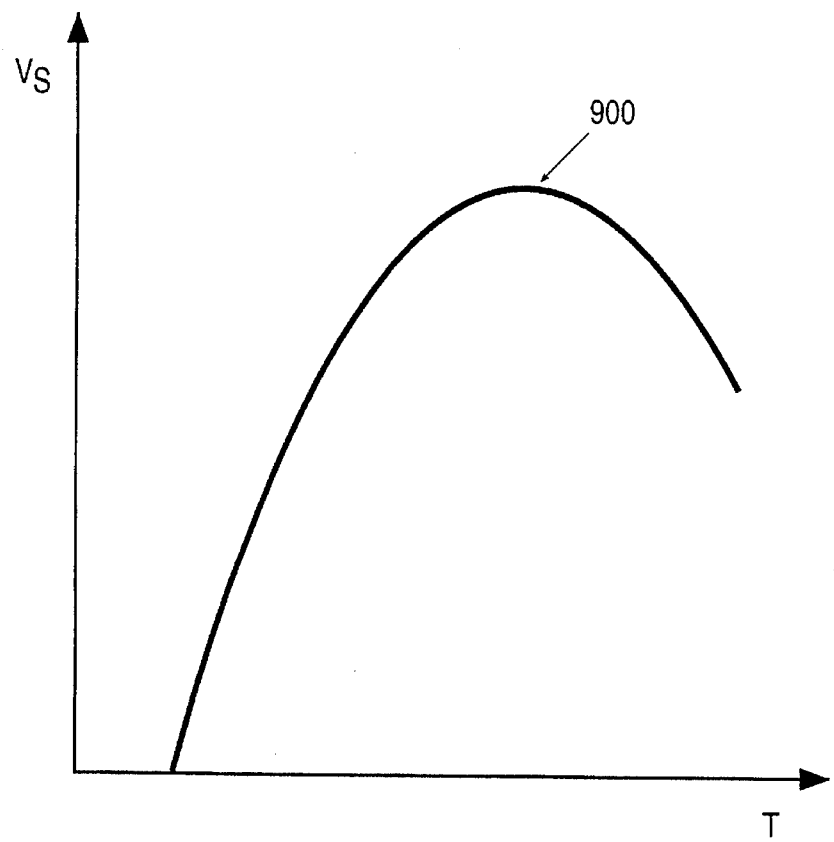
FIG. 9 shows a relationship between the velocity of sound through water and the temperature of the water.

As stated above, the temperature of water can be determined using a transducer set by first determining the average flight time. FIG. 9 is a graph of the velocity of sound through water, $V_s$, versus the temperature $T_w$ of the water. As may be seen, the velocity of sound through water, $V_s$, varies with the temperature $T_w$ of the water as a non-linear function. Conversely, the temperature $T_w$ is a double-sided function of the velocity of sound through water, $V_s$. Velocity is equal to the distance traveled divided by travel time. If the distance between the first and second transducers of a transducer set is known, the speed of sound $V_s$ through the pipe can be determined by calculating the flight time $t_f$. Once the flight time $t_f$ is known, the temperature $T_w$ of the water can be determined by the local processor 303 using a look-up table.

Given the timing of the receipt of the acoustic signals and its echoes as shown in FIG. 7, the average flight time $t_f$ for an acoustic signal generated by the transducer set of a meter as shown in FIGS. 5A and 5B is given by the following equation:

$$t_f = \frac{(t_{f1} + t_{f2})}{2} = \frac{(t3 - t1)}{2}, \quad (1)$$

wherein the first flight time $t_{f1}$ is the time it takes for an acoustic signal to travel from the first transducer and the second flight time $t_{f2}$ is the time it takes for an acoustic signal to travel from the second transducer to the first transducer. The time given by t3 minus t1 is, in fact, equal to the sum of the first and second flight times, wherein the first flight time $t_{f1}$ is equal to (t3-t2) and the second flight time $t_{f2}$ is equal to (t2-t1).

Figure 10:
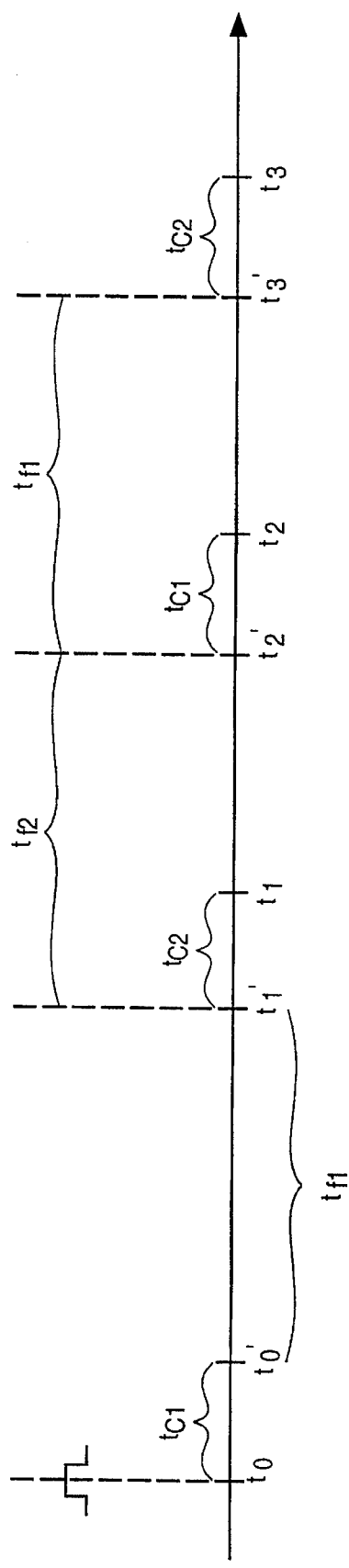
FIG. 10 is a time line showing the events of FIG. 7 in more detail.

That the conversion delays may canceled out by measuring the receipt of echoes is now shown with reference to FIG. 10, which shows a time line illustrating events of FIG. 7 in more detail. At time t0, the AC drive signal is applied to the first transducer 515. At time t0', after a delay of $t_{c1}$, the conversion delay of the first transducer 515, the first transducer 515 generates the acoustic signal. At time t1', the initial acoustic signal arrives at the second transducer 520 and a first echo of the acoustic signal is reflected back towards the first transducer 515. The time between t0' and t1' is the first flight time, $t_{f1}$. At time t1, the arrival of the acoustic signal is detected by the local processor 301 after a delay of $t_{c2}$, the conversion delay of the second transducer 520. It is clear that measuring the difference between t0 and t1, the time between applying the AC drive signal to the first transducer 515 and detecting receipt of the initial acoustic signal at the second transducer 520 does not accurately result in the average flight time, $t_f$.

The first echo arrives at the first transducer 515 at time t2. Simultaneously, a second echo is reflected back towards the second transducer 520. The time between t2' and t1' is equal to the second flight time $t_{f2}$. If it is assumed that the conversion delay times $t_{c1}$ and $t_{c2}$ are equal, the time between t2 and t1 is also equal to the second flight time $t_{f2}$. The second echo arrives at the second transducer 520 after the first flight time $t_{f1}$ at time t3'. At time t3, the receipt of the second echo is detected by the local processor after a delay of $t_{c2}$.

Assuming that the time to is equal to zero, the times t1 and t3 may be expressed by the following equations:

$$t1 = t_{f1} + t_{c1} + t_{c2} \quad (2)$$

$$t3 = 2t_{f1} + t_{f2} + t_{c1} + t_{c2} \quad (3).$$

When t1 is subtracted from t3, the conversion delays are canceled out, and the difference between t1 and t2 is equal to the sum of the first and second flight times. As described above, the flow rate of water symmetrically effect the first and second flight times. Thus, the first and second flight times $t_{f1}$ and $t_{f2}$ are given by the following equations, respectively:

$$t_{f1} = t_f - t_{flow}, \quad (4)$$

and $$t_{f2} = t_f + t_{flow} \quad (5),$$

wherein the time $t_{flow}$ is the time difference attributable to the flow rate of water through the station. When the first and second flight times are added to one another, the effects of flow rate given by $t_{flow}$ cancel out. Therefore, the average of the first and second flight times given by equation (1) yields the average flight time $t_f$ without the effects of flow or conversion delays.

At this time, it should be noted that there may be time delays associated with reflecting an acoustic signal by a transducer. These delays have been ignored in the above equations to simplify the discussion. The time delay or phase shift of an echo depends on the relationship of the frequency of the acoustic signal with the resonant frequency of the reflecting transducer. As an acoustic signal is reflected again and again, the time delays associated with reflection accumulate. Thus, the time t3 of equation (3) above would include the addition of reflection delay times $t_{rd1}$ and $t_{rd2}$, associated with reflection of echoes at the first and second transducer, respectively. If the reflection delays are constant, they may be accounted for in a straightforward manner. Some transducers are temperature sensitive, however, which may result in the reflection delay time $t_{rd1}$ and $t_{rd2}$ being temperature dependent. If the function of the resonant frequency in terms of temperature is known or approximated, the reflection delay times may be accounted for. Further, the reflection delay times may be reduced by selecting the first and second transducer 515 and 520 to have the same resonant frequency and by altering the frequency of the drive signal to match the resonant frequency as the temperature of the water changes.

Returning to FIG. 5A, the distance between the first transducer 515 and the second transducer 520 is shown as $D_{total}$. If equation (1) is used to calculate the flight time, $t_f$, the velocity of sound $V_s$ in the inlet pipe 301 is expressed by the following equation:

$$V_s = \frac{(D_{total})}{t_f} \quad (6)$$

For systems operating at temperatures below the peak velocity of sound through water, this measurement is unambiguous. For systems operating at temperatures near the peak velocity of sound through water, the measurement becomes ambiguous. To determine which side of the peak the temperature of water is located, alternative metering arrangements may be used. Some alternative metering arrangements are described below.

To measure the temperature differential between the inlet and outlet of a station, the velocity of sound $V_s$ is calculated both at the inlet and the outlet by the inlet transducer set and the outlet transducer set. The temperature of the water is calculated for each transducer set. The change in temperature for the water flowing through the station 201 is determined by the local processor 303 by subtracting the temperature of the outlet from the temperature of the inlet.

It will be appreciated that to measure temperature as described above, it is sufficient to provide the first transducer 515 and to replace the second transducer 520 with a reflector made of any appropriate acoustic reflecting material. The time to complete a first round-trip and a second round trip are recorded, and the sum of the two round-trips is divided by four to yield the flight time, $t_f$.

5.6 Applying Time of Flight Measurement to Measure Rate of Flow

The rate of flow may be calculated by determining the difference between the first and second flight times if the local processor 303 knows the inner diameter dinternal of the inlet pipe 301, the total distance between the between the transducers $D_{total}$, and the distance, $D_{flow}$, over which the acoustic signal traverses the inlet pipe 301 while in the flow of the water. The velocity of flow $V_f$ affects the time required to traverse the portion of flight path that is in the flow but has no effect on the portion of the flight path outside the flow.

First, the time required to travel from the first transducer 515 to the second transducer 520, and vice versa, is measured. This yields the first flight time $t_{f1}$ and the second flight time $t_{f2}$, respectively. To reduce the effects of conversion delays, the following equations are used to determine the first flight time $t_{f1}$ and the second flight time $t_{f2}$:

$$t_{f1} = t3 - t2, \tag{7}$$

and $$t_{f2} = t2 - t1 \tag{8}$$

Again, these equations reflect the timing of events as shown in FIGS. 7 and 10. The time $t_{flow}$ is given by the following equation:

$$t_{flow} = \frac{(t_{f2} - t_{f1})}{2}. \tag{9}$$

The flow velocity $V_f$ of the acoustic signal is thus given by the following equation:

$$V_f = \frac{(D_{flow})}{(t_{flow})}. \tag{10}$$

When the distance $D_{flow}$ is not explicitly known, the flow velocity $V_f$ can be equivalently expressed using the following equation:

$$V_f = \frac{(D_{total})(t_{flow})}{t_f^2}. \tag{11}$$

Again, the above equations do not account for time delays due to reflection. If such reflection time delays do in fact occur, the error introduced by the reflection time delays is equal to $t_{rd2}$ minus $t_{rd1}$. This error may be accounted for in the data of the look-up table or it may be ignored if negligible. It should also be noted that the angle at which the acoustic signal traverses the flow vector affects the calculation of flow velocity $V_f$ when vector analysis is undertaken. This angle may be accounted for by using known mathematical relationships.

All of the measured distances and volumes including $D_{flow}$ and $d_{internal}$, are subject to thermal expansion, which may be accounted for using the constants of thermal expansion for the material of the inlet pipe 301. Further, other factors such as pressure affect the flow velocity $V_f$. These factors can also be accounted for using well-known formulae and calculations.

6.0 Phase Difference Measurement Method and Apparatus

As mentioned previously, a second type of measurement method measures the phase difference between two simultaneously generated acoustic signals. The phase difference between two acoustic signals, which is given by a phase angle $\Phi$ (phi), may be expressed as a time delay t-delay that is equal to the difference between the first flight time and the second flight time. This time delay $t_{delay}$ may be used to determine the flow velocity $V_f$ using equations (9) and (10), above. Thermistors are used to determine the temperature differential. Alternatively, time of flight measurements using the transducers may be performed as described above to determine the temperature differential.

The time required to complete a full period ($2\pi$ radians) of an acoustic signal having the resonant frequency f of the transducer set is given by the following equation:

$$t_{full} = \frac{1}{f}. \tag{12}$$

The time delay $t_{delay}$ associated with the phase difference $\Phi$ (phi) is given by the following equation:

$$t_{delay} = \frac{\phi}{2\pi f} \tag{13}$$

wherein the phase difference $\Phi$ is in radians. Given that the resonant frequency and anti-resonant of the transducer set are known, only the phase difference $\Phi$ needs to be determined to determine the flow velocity $V_f$.

6.1 Meter Mechanical Configuration

Figure 11:
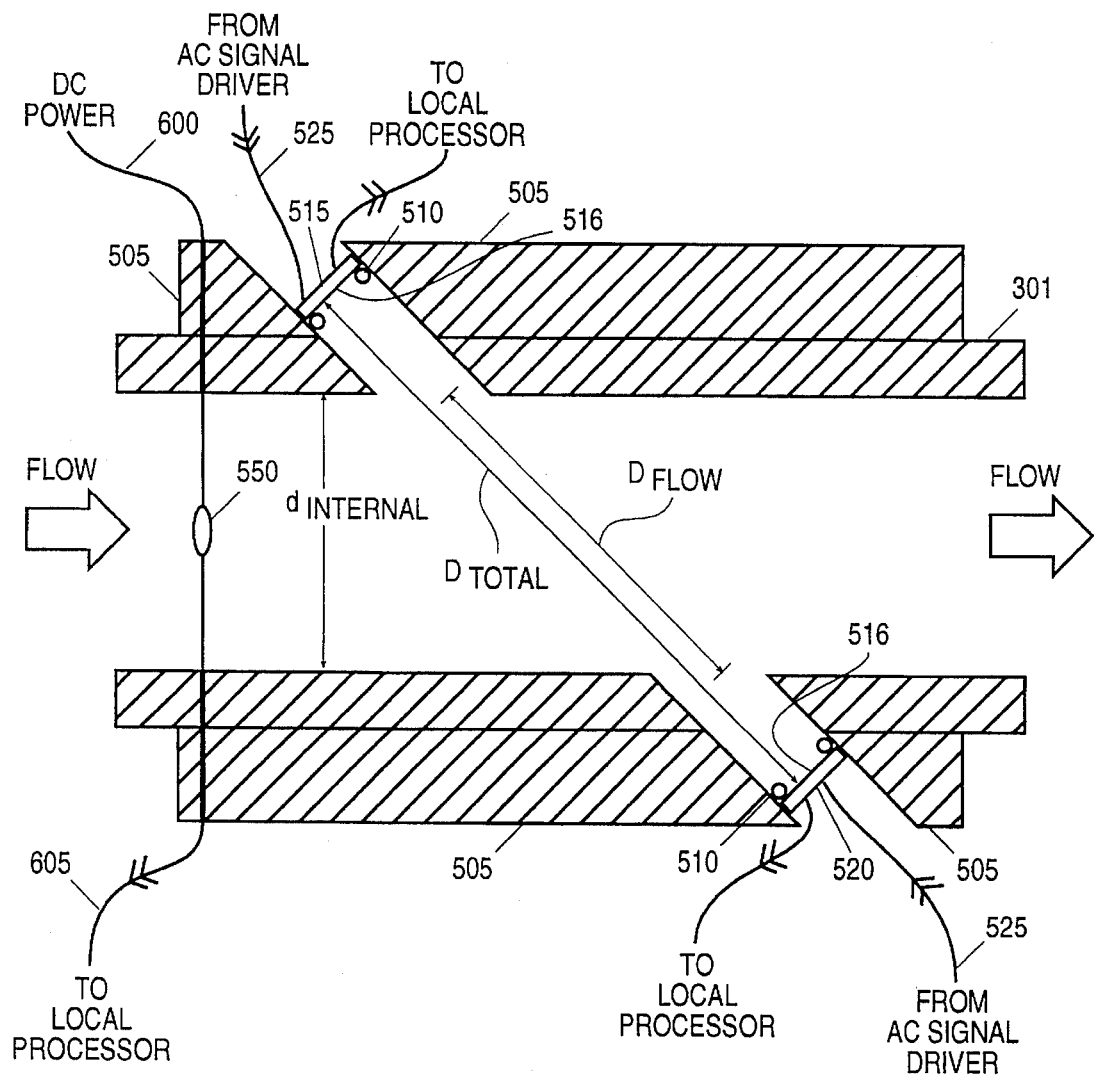
FIG. 11 shows the mechanical configuration of an inlet meter that implements a phase difference measurement method.

The mechanical configuration of the transducer set for an inlet meter 310 that measures the phase difference of two acoustic signals is shown in FIG. 11. The mechanical configuration inlet meter 310 of FIG. 11 does not differ appreciably from the mechanical configuration of the inlet meter 310 shown in FIG. 5B. The primary difference is that the second transducer 520 is also provided with a power line for receiving a driving pulse. This allows the first and second transducers 515 and 520 to be driven simultaneously.

6.2 Meter Electrical Circuitry

Figure 12:
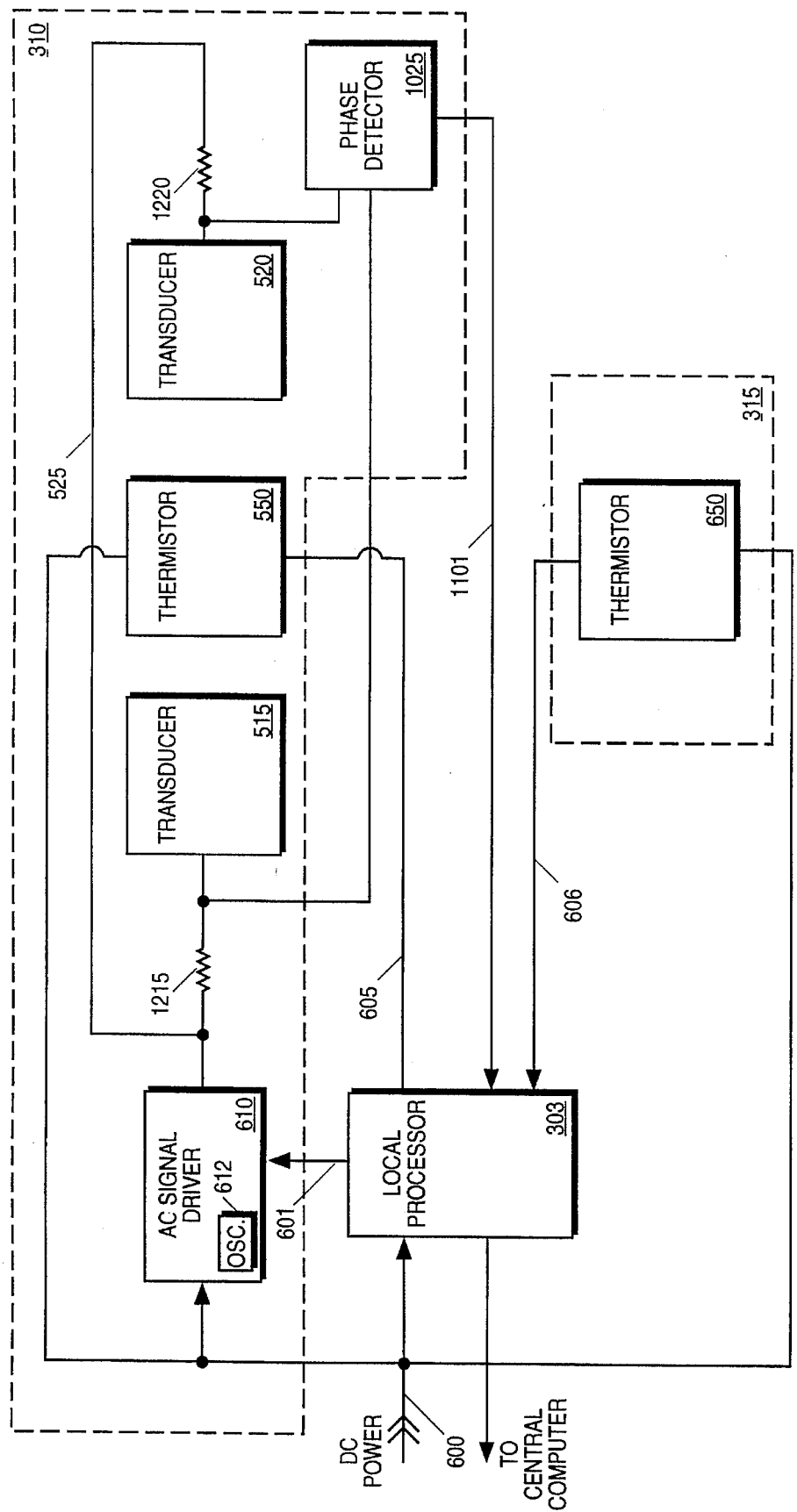
FIG. 12 shows an electrical circuit for an inlet meter that implements a phase difference measurement method.

FIG. 12 shows the electrical circuitry for a metering apparatus that determines the phase difference between two acoustic signals for calculating the flow rate of water through the station 201. The metering apparatus of FIG. 12 is substantially that shown in FIGS. 5B and 6B, with the exception that the power line 525 of inlet meter 310 is coupled to the second transducer 520 for stimulating the second transducer 520 to generate a second acoustic signal. The power line 525 remains coupled to the first transducer 515 for generating the first acoustic signal.

The inlet meter 310 also includes a phase detector circuit 1225, and resistors 1215, and 1220. The phase detector circuit 1225 may be implemented using circuits known in the prior art, or their equivalents. For example, a phase detector circuit of type RPD-1 sold by Mini-Circuits of Brooklyn, N.Y., may be used. Similarly, the switches 1215, 1216, 1220, and 1221 may be implemented using any appropriate semiconductor switching device.

At the beginning of a measurement cycle, the AC drive signal is applied simultaneously to the first and second transducers. The AC drive signal is applied for less than a single calibration flight time such that the first transducer 515 can be used to detect the second acoustic signal and such that the second transducer 520 can be used to detect the first acoustic signal. The AC drive signal is removed by turning off the AC signal driver, including the driving oscillator that sets the frequency of the AC drive signal.

The phase detector circuit 1225 receives the electrical signals output by the first and second transducers 515 and 520 in response to the second and first acoustic signals. The phase detector outputs a DC voltage that is proportional to the cosine of the phase difference $\Phi$ (phi) between the output signals of the first and second transducers 515 and 520. The constant of proportionality is equal to the products of the amplitudes of the input signals to the phase detector. The output of the phase detector circuit 1225 is delivered to the local processor 303 via signal line 1201.

To simplify the measurement of the phase difference, only the originally received first and second acoustic signals are used to detect phase difference. As described above, the phase of the acoustic signal may be shifted upon reflection from the face of a transducer. Therefore, the first echo of an acoustic signal may be out of phase with the acoustic signal. The phase shifts of each subsequent echo are cumulative. Therefore, for each measurement cycle, the originally received acoustic signals are used to detect the phase difference, and the echoes of the acoustic signals are ignored. Time sufficient to allow the echoes of the acoustic signals to die out is provided between the beginning of each measurement cycle. To more accurately measure flow rate using the phase difference method, the actual measurement of flow rate may be the average of several consecutive measurement cycles.

An alternative method for measuring phase difference requires that the first and second acoustic signals be transmitted at different times. Rather than comparing the phases of the acoustic signals to one another, the phases of the acoustic signals are compared to the signal output by the oscillator of the AC signal driver. For example, the AC drive signal is applied to the first transducer 515 for less than one calibration flight time to generate the first acoustic signals. The AC drive signal is removed, but the oscillator of the AC signal driver continues operating. When the second transducer 520 detects the first acoustic signal, the phase of the electrical signal output by the second transducer 520 is compared to phase of the signal output by the oscillator 612. The difference in phase between the two signals yields the first flight time, $t_{f1}$. After the echoes are allowed to die down, the second acoustic signal is generated, and the phase difference between the second acoustic signal received by the first transducer 515 and the oscillator 612 is determined.

Simultaneous transmission of the first and second acoustic signals may be preferable to sequential transmission of the first and second acoustic signals. First, because the oscillator 612 is also switched off, less noise is injected by the electrical circuitry into the electrical signal output by a transducer when the oscillator 612 continues to operate. Second, simultaneous transmission of the two acoustic signals results in the measurement of the same "information" in both direction on the flight path.

If the local processor 303 performs digital signal processing, the phase detector circuit 1225 may not be required. The local processor 303 can use the digital forms of the electrical outputs of the transducers directly to determine the phase difference.

6.3 Meter Operation

Figure 13:
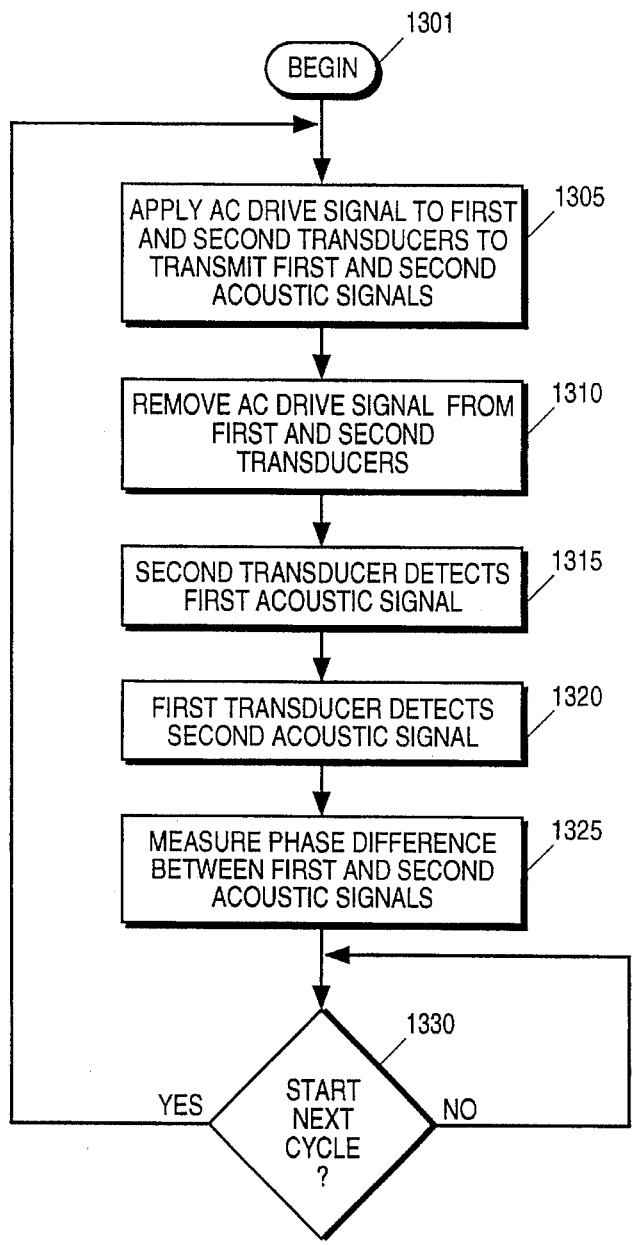
FIGURE 13 is a flow chart illustrating the operation of an inlet meter that implements a phase difference measurement method.

FIG. 13 is a flow chart showing the operation of the inlet meter 310 shown in FIG. 12. The process begins at process block 1301. A measurement cycle is begun at process block 1205 when the AC drive signal is applied to the first and second transducers 515 and 520 such that the first transducer 515 transmits a first acoustic signal through the water towards the second transducer 520 and such that the second transducer 520 transmits a second acoustic signal through the water towards the first transducer 515. The AC drive signal is removed from first and second transducers 515 and 520 at process block 1310 such that the first and second transducers 515 and 520 can be used to detect the second and first acoustic signals, respectively.

At process block 1315, the second transducer 520 detects the first acoustic signal. At process block 1320, the first transducer 515 detects the second acoustic signal. The events of process blocks 1315 and 1320 may occur simultaneously or in the reverse order shown in FIG. 13. At process block 1325, the phase detector circuit 1225 measures the phase difference between the first and second acoustic signals. Echoes of the first and second acoustic signals bounce back and forth between the transducers such that the phase detector continues to output a phase difference signal. When it is determined at decisional block 1330 that the next measurement cycle is to begin, the process begins again at process block 1305.

7.0 Alternative Mechanical Configurations

Figure 14:
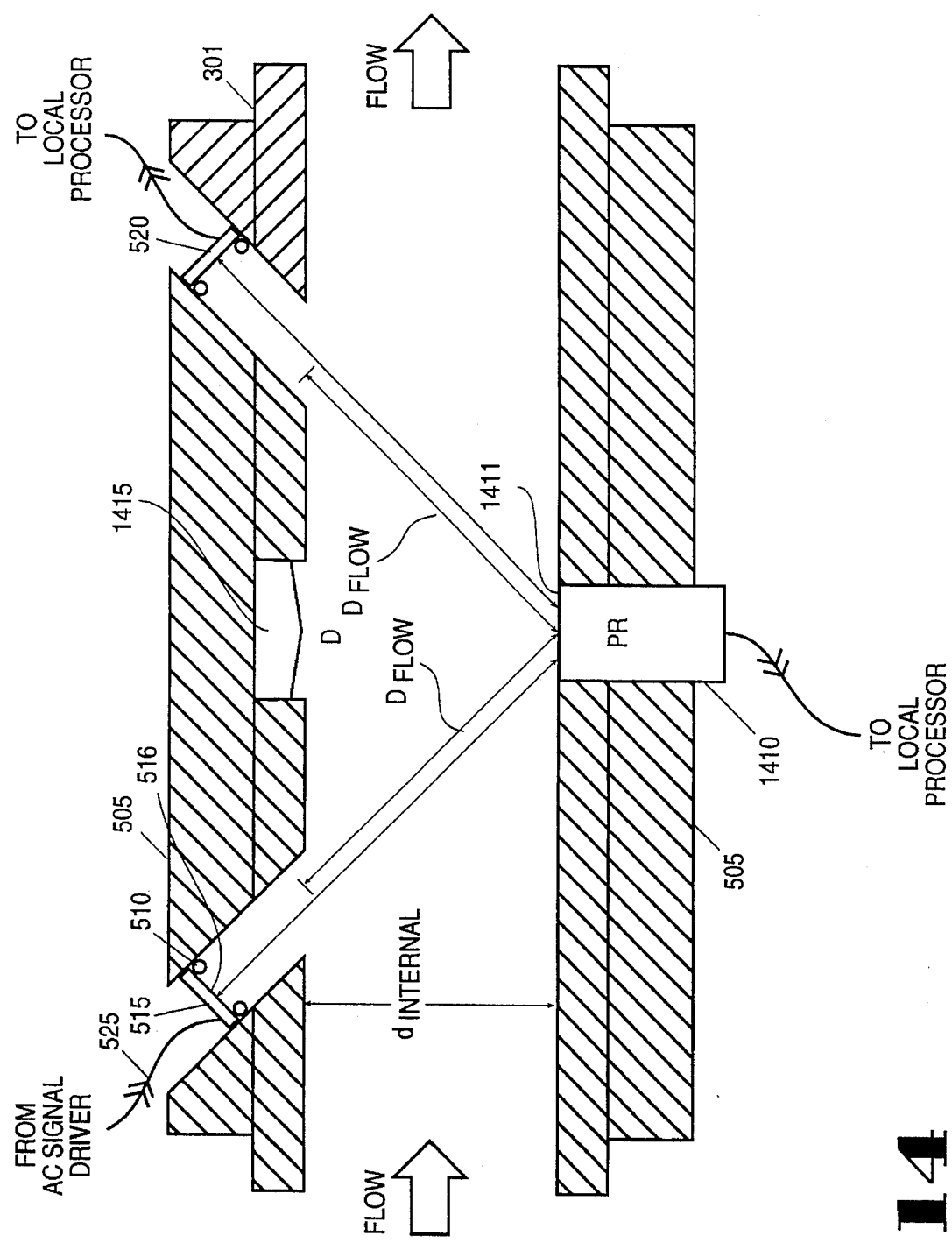
FIG. 14 shows a mechanical configuration of a meter capable of more accurately determining the velocity of sound through water when the temperature of the water is near the peak of the curve shown in FIG. 9.

FIG. 14 shows an inlet meter apparatus according to another embodiment. As shown, the inlet meter 310 includes a first transducer 515 and a second transducer 520 that are located on the same wall of the pipe, rather than on opposite walls of the pipe as shown in FIGS. 5A and 5B. The inlet transducer set also includes a reflector transducer 1410, which is a piezoelectric crystal having the same operating frequency as the other transducers. The face 1411 of the reflector transducer 1410 is shaped to be flush with the inner surface of the pipe to minimize disturbance of the liquid flow.

The faces 516 and 521 of the first and second transducers 515 and 520 are oriented towards the face 1411 of the third transducer 1410 such that the acoustic signal echoes back and forth between the first and second transducers 515 and 520 in a manner similar to that described with respect to FIGS. 5A and 5B. The third transducer 1410 reflects the initial acoustic signal and the echoes of the acoustic signal. The inlet transducer set 310 also includes a passive deflector 1415, which is recessed within the wall of the inlet pipe 301 to minimize flow disturbance. The face of the deflector 1415 are beveled to direct away and dissipate any sound broadcast by the reflector transducer 1410. An outlet transducer set may be equivalently configured and placed in the outlet pipe 302. This embodiment of the inlet transducer set effectively increases the path length between the transmitting and second transducers 515 and 520, which results in the increased accuracy of flight time measurements. The inlet meter 310 shown in FIG. 14 may include a thermistor for measuring temperature. The inlet meter shown in FIG. 14 may be adapted for either time lag or phase difference analysis.

The inlet meter of FIG. 14 allows for the determination of temperatures when the velocity of sound through water is near the peak value. Because there is a temperature gradient due to radiation from the inlet meter of FIG. 14, the acoustic path furthest from the heat source will be at a lower temperature than the acoustic path closest to the heat source. The differential in flight times between the paths near the heat source and the path away from the heat source allows for the determination of which side of the peak velocity of sound the measurements are on. An alternative configuration to FIG. 14 which also allows for the determination of temperature when the velocity of sound is near the peak velocity may be accomplished using two meters of the type shown in FIG. 5A. The two meters are mounted in-line and close together. Data from the two meters are then used to determine whether the gradient of the velocity of sound is positive or negative. The correct table look-up for temperature follows.

Figure 15:
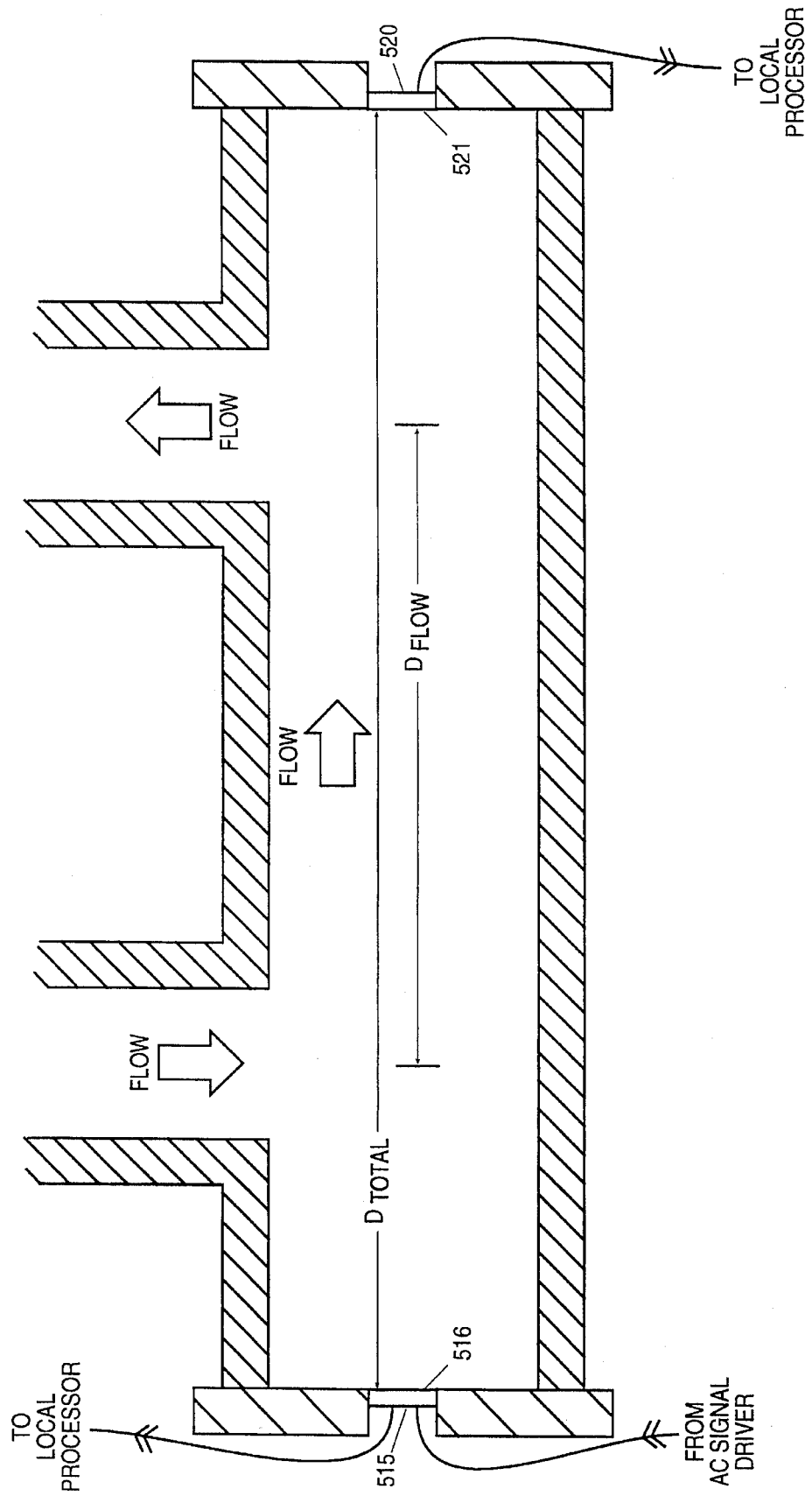
FIG. 15 shows a mechanical configuration providing for path lengths that are independent of pipe diameter.

FIG. 15 shows another embodiment of the inlet meter apparatus. For this embodiment, the transmitting and second transducers are mounted in plumbing T's so that they face one another along the axis of flow. The liquid flows in and out of the right angles of the T's. The advantage of this embodiment is that path length between the transducers is not constrained by the diameter of the pipe. Longer path lengths are therefore more easily achieved, and the precision of measurement is enhanced.

8.0 Acoustic Communication and Power Transmission

Figure 16:
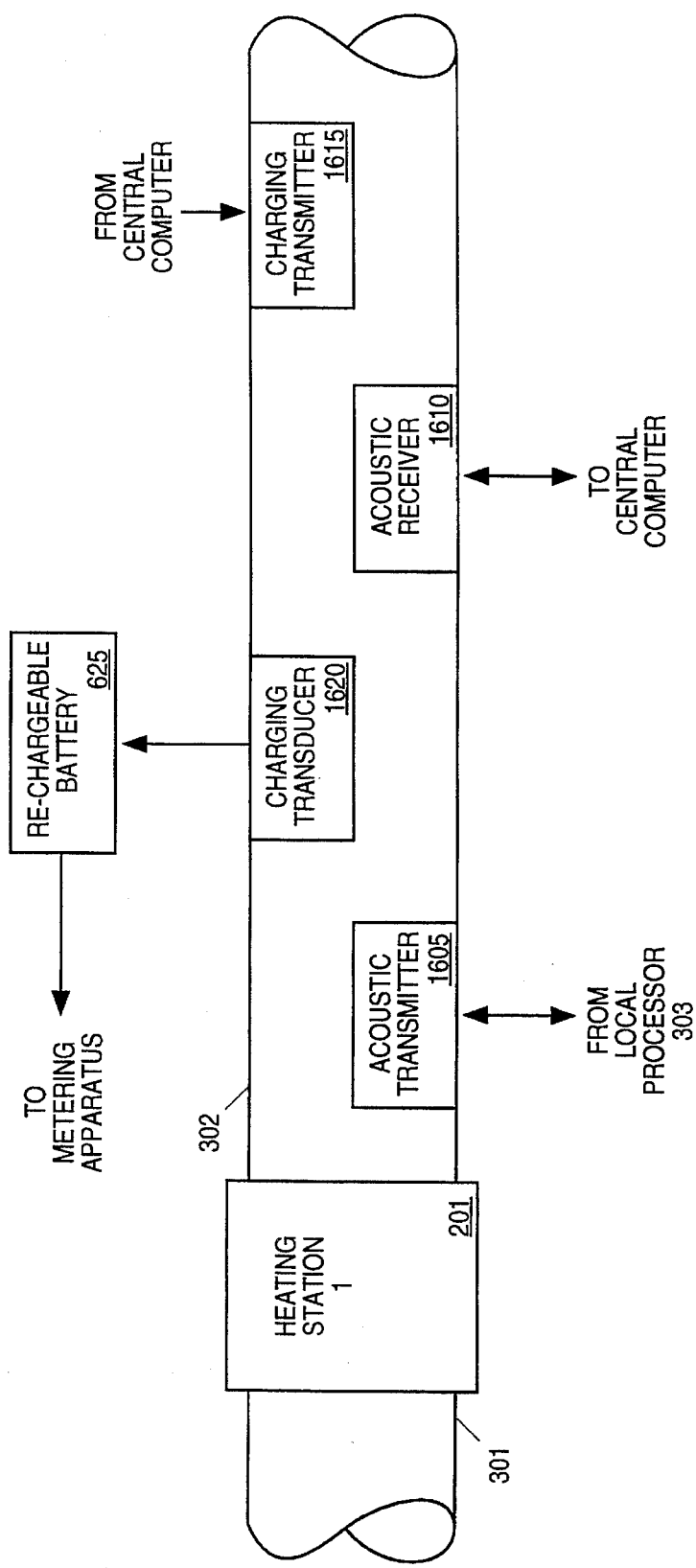
FIG. 16 shows a metering apparatus including circuitry for power transmission and computer communication using acoustic signals.

FIG. 16 shows one implementation of circuitry for accomplishing communication between a heating station and the central computer using the pipes as a serial link and the water in the pipes as the transmission medium. The local processor 303 of a metering apparatus connected to measure the energy consumption of the heating station 201 controls the acoustic transmitter 1605, which may also act as a receiver. Acoustic transmitter 1605 may be a piezoelectric transducer. The central computer 410 of the outlet is coupled to an acoustic receiver 1610, which may be a piezoelectric transducer having approximately the same resonant frequency as the acoustic transmitter 1605. Communication may be accomplished through the appropriate encoding of the acoustic signal output by the acoustic transmitter 1605.

FIG. 16 also shows an implementation of circuitry transmitting power through the pipes of the outlet. A charging transmitter 1615 controlled by the central computer outputs a large amplitude acoustic signal, as described above. A charging transducer 1620 having a resonant frequency near the frequency of the acoustic signal output by the charging transmitter 1615 converts the acoustic signal into an electrical signal, which is used to charge a rechargeable battery 1625. Any type of rechargeable battery and circuitry for converting the AC electrical signal to DC value may be used. The rechargeable battery is used to supply DC power to the metering apparatus.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A system for measuring energy consumption in a mass transfer heat delivery system having a multiplicity of stations, the system for measuring energy consumption comprising:

a plurality of metering circuits, each metering circuit for metering energy consumption of at least one station, each metering including:

an inlet meter for being coupled to an inlet pipe of a first station, the inlet pipe for carrying a liquid into the station, the inlet meter comprising:

a transducer set in contact with liquid, the transducer set for transmitting an acoustic signal through the liquid of the inlet pipe and for detecting a flow rate of liquid through the inlet pipe using the acoustic signal; and circuitry for detecting a temperature of the liquid in the inlet pipe;

an outlet meter for being coupled to an outlet pipe of the first station, the outlet pipe for carrying the liquid away from the first station, the outlet meter for detecting a temperature of the liquid at the outlet pipe;

a local processor coupled to receive electrical signals output by the inlet meter and the outlet meter, the local processor for calculating the flow rate of liquid through the inlet pipe and for calculating a difference between the temperature of liquid at the inlet pipe and the temperature of liquid at the outlet pipe, the local processor for transmitting results of the calculations;

a network link coupled to each of the local processors of the plurality of metering apparatae, the network link for communicating results calculated by the local processors; and a central processor coupled to receive the results calculated by the local processors.

2. The system of claim 1, wherein the inlet meter of each metering circuit comprises:

a signal driver for supplying a drive signal in response to a control signal;

a first transducer coupled to the signal driver, the first transducer for being mounted to the inlet pipe of the station such that the first transducer is in contact with the liquid, the first transducer for transmitting a first acoustic signal through the liquid when the drive signal is supplied by the signal driver and for detecting a second acoustic signal when the drive signal is removed;

a second transducer coupled to the signal driver, the second transducer for being mounted to the inlet pipe such that the second transducer is in contact with the liquid, the second transducer for transmitting the second acoustic signal when the drive signal is supplied by the signal driver and for detecting the first acoustic signal when the drive signal is removed;

a phase detector circuit coupled to the first and second transducers, the phase detector circuit outputting a phase difference signal in response to a phase difference between the first and second acoustic signals detected by the second and first transducers, wherein the local processor is coupled to the signal driver and the phase detector circuit, the local processor for supplying the control signal to the signal driver and for using the phase difference signal to calculate the flow rate of liquid through the station.

3. The system of claim 2, wherein the inlet meter further includes a first thermistor for being placed in the pipe such that the first thermistor in contact with the liquid, the first thermistor being coupled to the local processor for outputting a temperature signal that indicates a temperature of the liquid, wherein the local processor uses the temperature signal to determine the temperature of liquid in the pipe.

4. The system of claim 3, wherein the outlet meter further includes a second thermistor for being placed in the outlet pipe such that the second thermistor is in contact with the liquid, the second thermistor being coupled to the local processor for outputting a temperature signal that indicates a temperature of the liquid, wherein the local processor uses the temperature signal to determine the temperature of liquid in the outlet pipe.

5. The system of claim 1, wherein the inlet meter further comprises:

a signal driver for supplying a drive signal in response to a control signal being in an active state;

a first transducer coupled to the signal driver, the first transducer for being mounted to the inlet pipe such that the first transducer is in contact with the liquid, the first transducer for transmitting an acoustic signal through the liquid in response to the drive signal supplied by the signal driver, for reflecting echoes of the acoustic signal, and for detecting echoes of the acoustic signal when the drive signal is removed; and a second transducer coupled to the signal driver, the second transducer for being mounted to the inlet pipe such that the second transducer is in contact with the liquid, the second transducer for detecting the acoustic signal, for reflecting echoes of the acoustic signal, and for detecting echoes of the acoustic signal, wherein the local processor is coupled to the signal driver, the first transducer, and the second transducer, the local processor for providing the control signal to the signal driver and for determining the flow rate of liquid through the pipe using a first flight time and second flight time detected by the first and second transducers, wherein the first flight time is equal to a time for a first echo to travel from the first transducer to the second transducer and the second flight time is equal to a time for a second echo to travel from the second transducer to the first transducer.

6. The system of claim 5, wherein the inlet meter further includes a thermistor for being placed in the inlet pipe such that the thermistor is in contact with the liquid, the thermistor being coupled to the local processor for outputting a temperature signal that indicates a temperature of the liquid, wherein the local processor uses the temperature signal to determine the temperature of liquid in the inlet pipe.

7. The system of claim 6, wherein the outlet meter further includes a second thermistor for being placed in the outlet pipe such that the second thermistor is in contact with the liquid, the second thermistor being coupled to the local processor for outputting a temperature signal that indicates a temperature of the liquid, wherein the local processor uses the temperature signal to determine the temperature of liquid in the outlet pipe.

* * * * *

UNITED STATES PATENT AND TRADEMARK OFFICE
CERTIFICATE OF CORRECTION

PATENT NO. : 5,502,652
DATED : March 26, 1996
INVENTOR(S) : Hoggatt et al.

It is certified that error appears in the above-indentified patent and that said Letters Patent is hereby corrected as shown below:

```
In the Abstract, line 23, change "echoes when" to --echoes are
recorded and used in calculations when--.
```

Signed and Sealed this

Third Day of September, 1996

Attest:

BRUCE LEHMAN

Attesting Officer     Commissioner of Patents and Trademarks